Sept. 29, 1953  G. BITZER  2,653,461
DRAWOFF TENSIONING MEANS FOR KNITTING MACHINES
Filed April 12, 1951  13 Sheets-Sheet 2
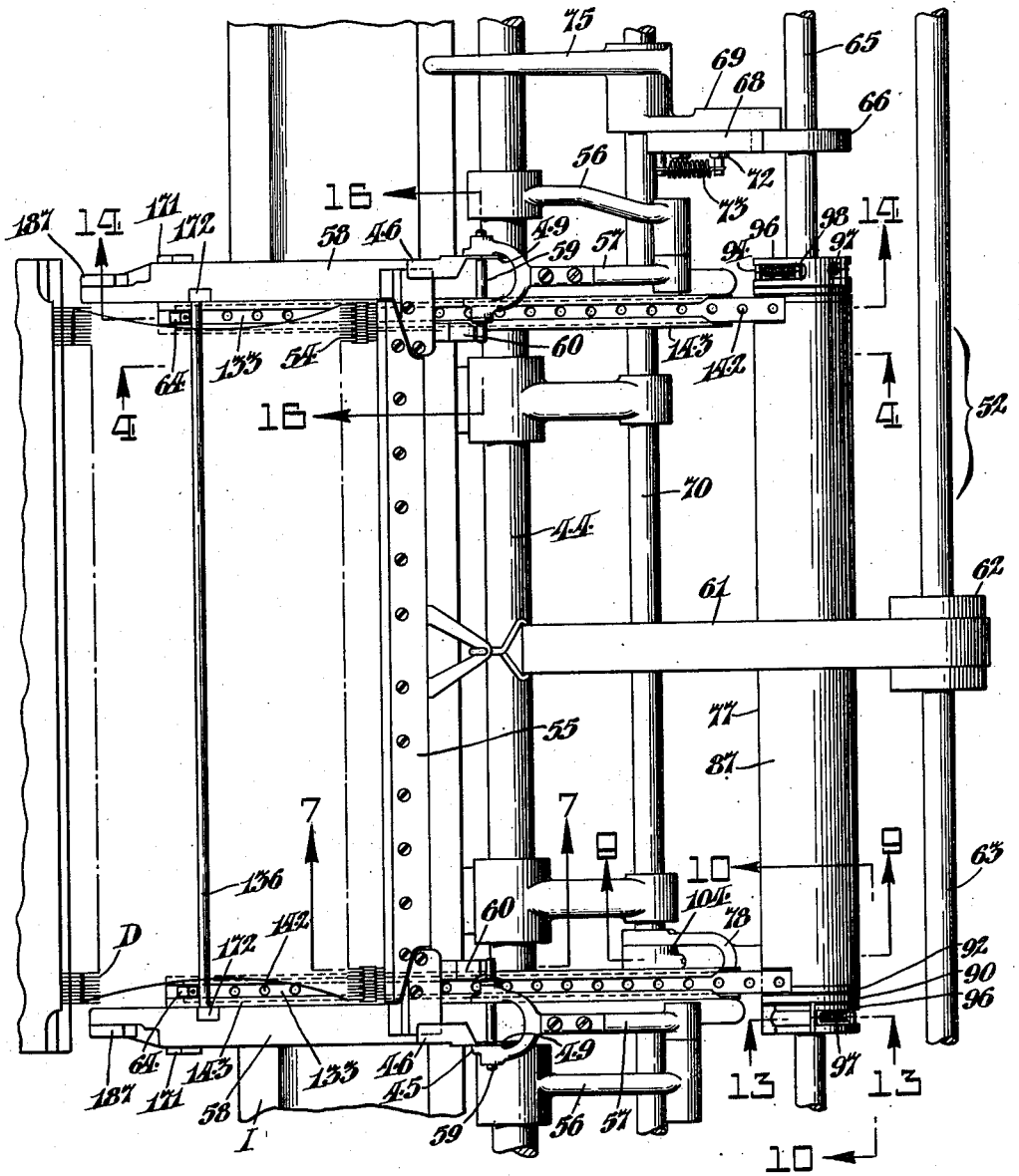
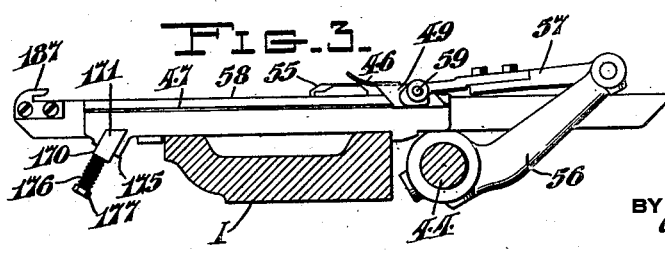
INVENTOR
*Gottlob Bitzer*
BY *Carl S. Olson*
ATTORNEY

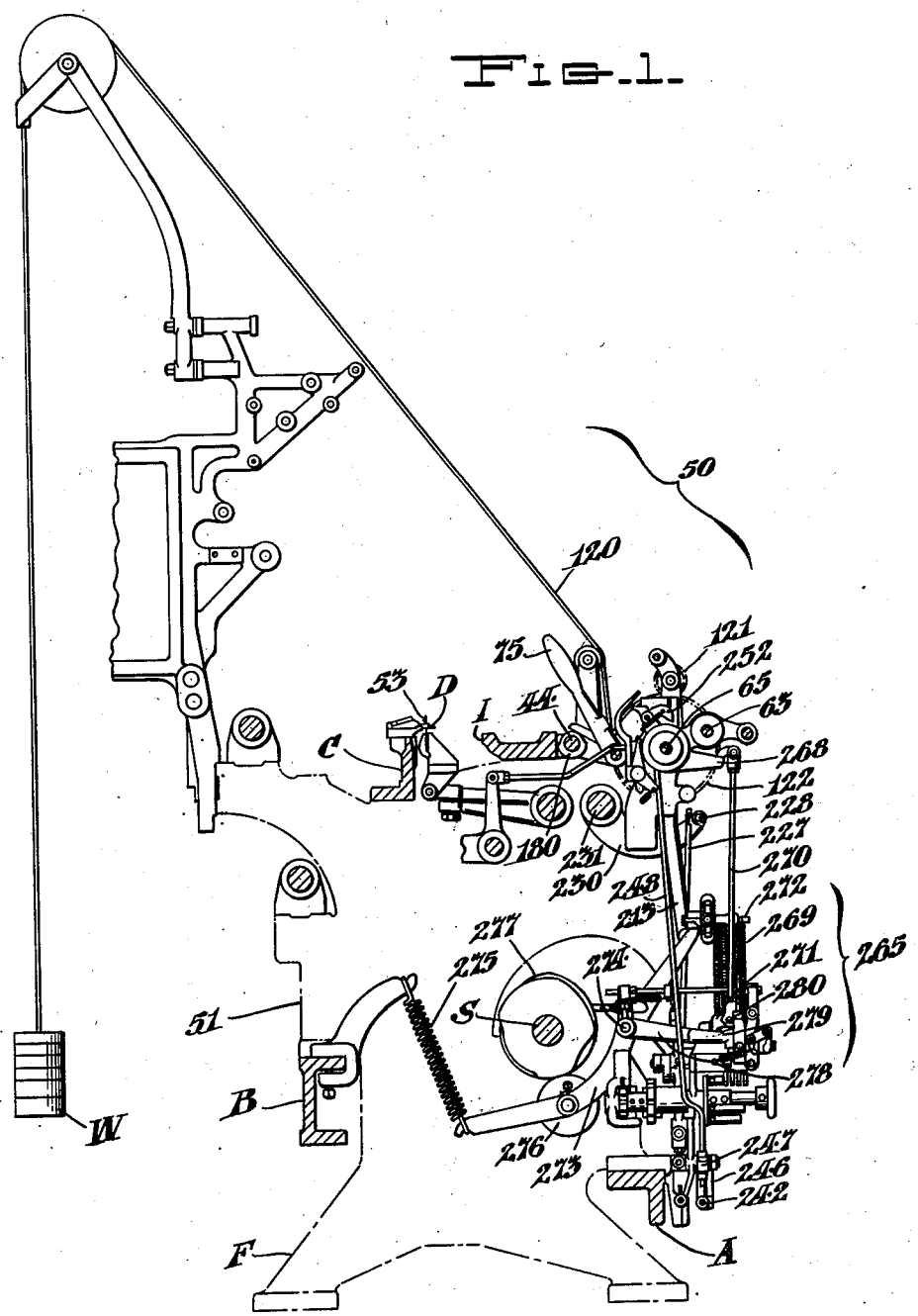

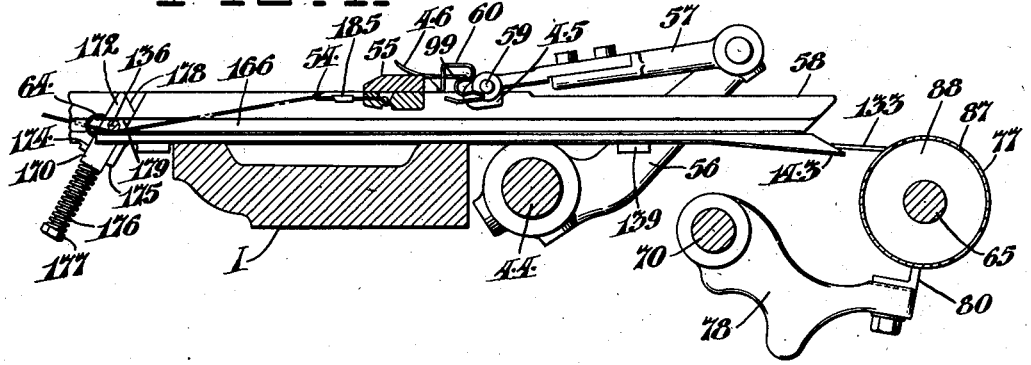
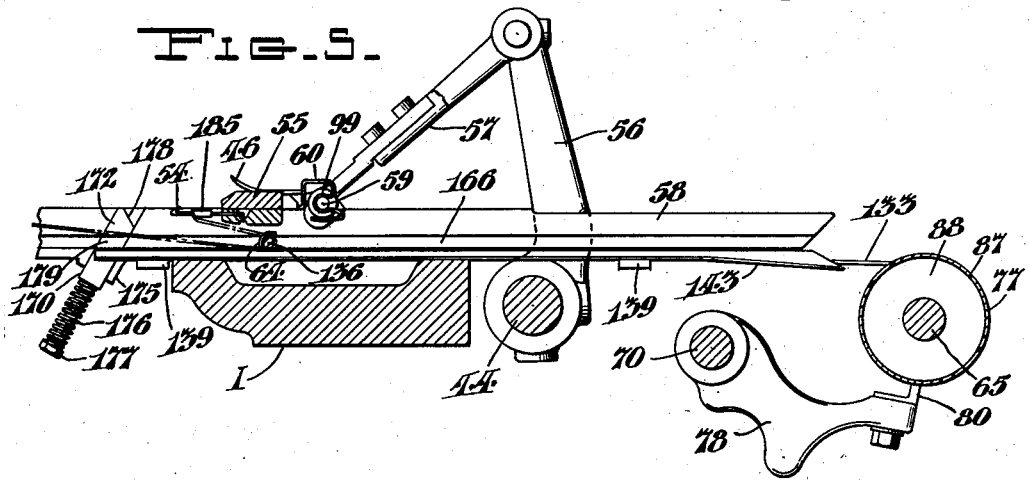
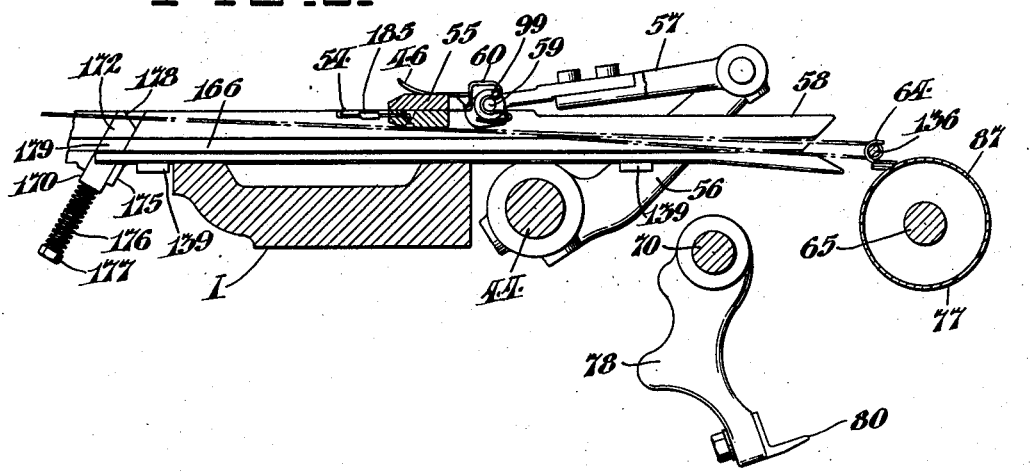

Sept. 29, 1953 G. BITZER 2,653,461
DRAWOFF TENSIONING MEANS FOR KNITTING MACHINES
Filed April 12, 1951 13 Sheets-Sheet 4
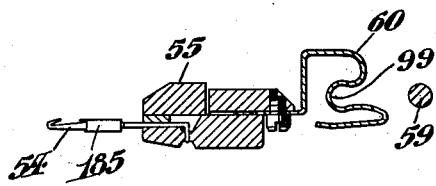
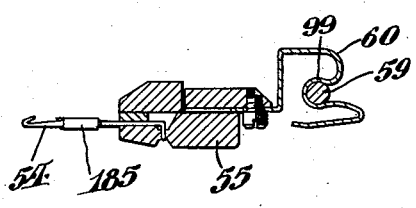
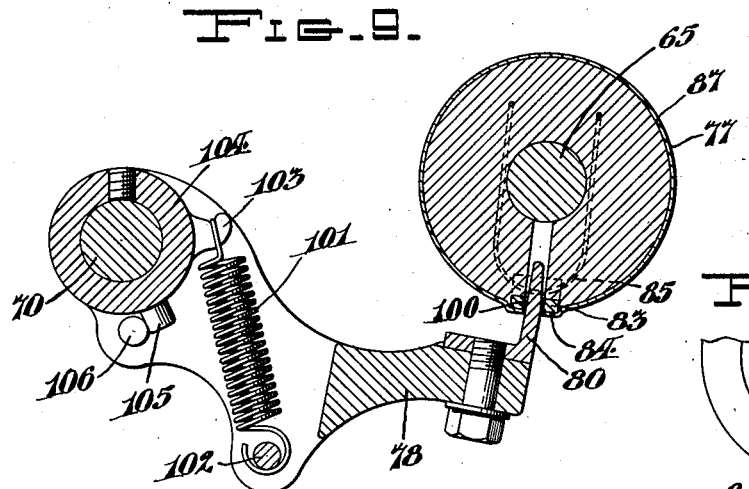
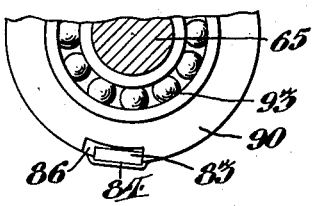
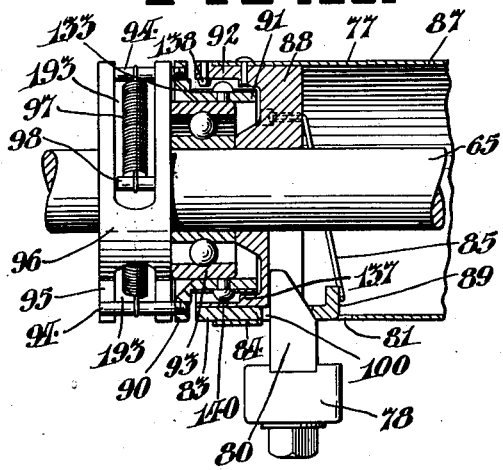
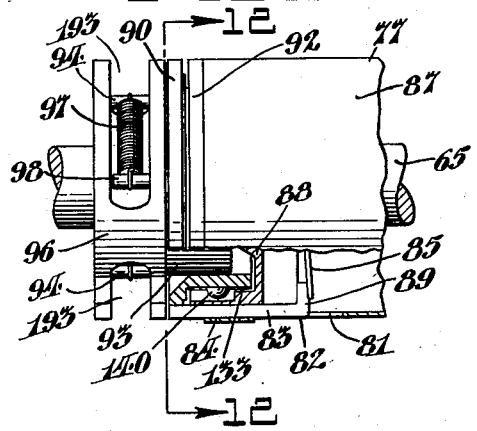
INVENTOR
*Gottlob Bitzer*
BY *Carl S. Olson*
ATTORNEY

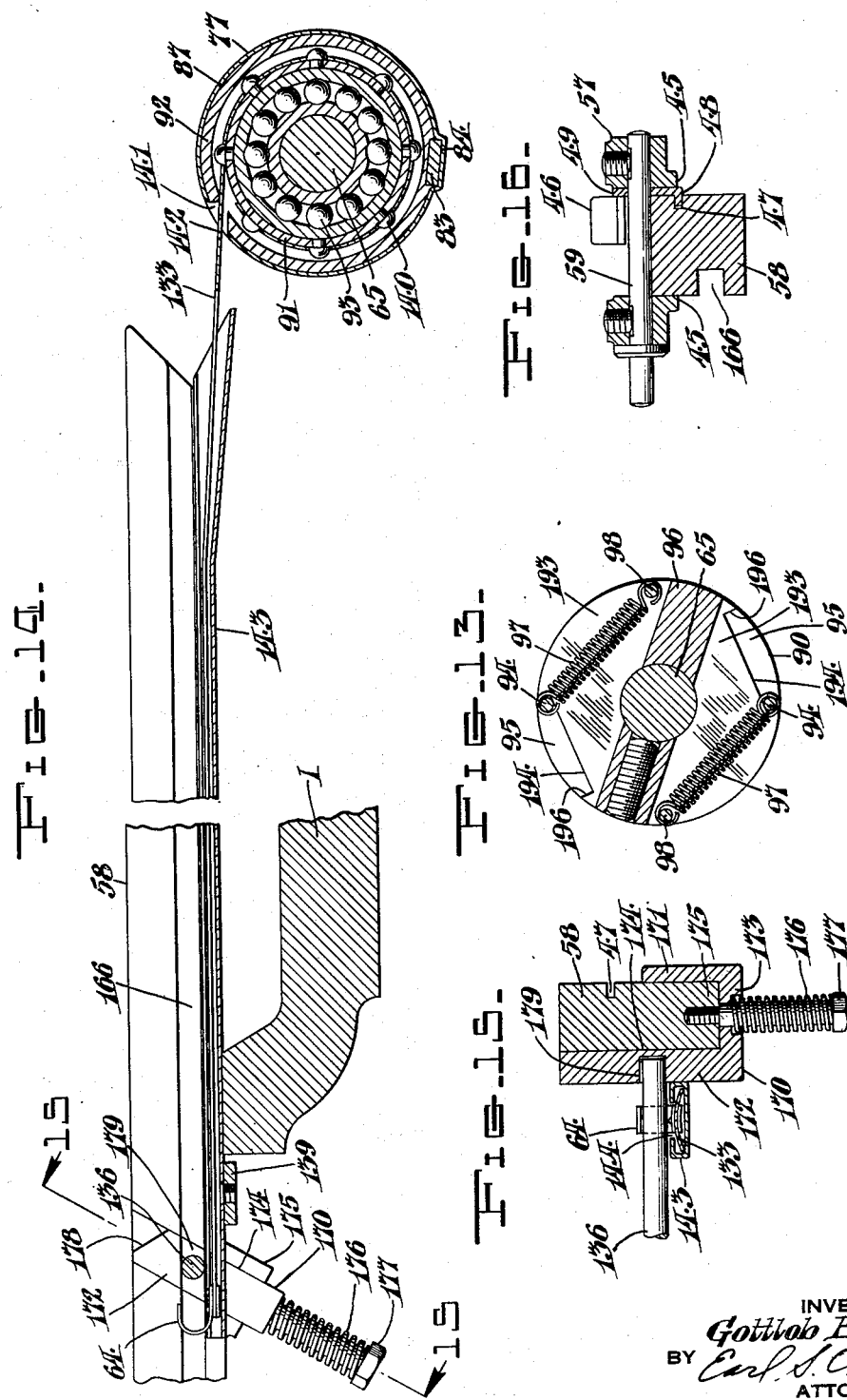

Sept. 29, 1953 G. BITZER 2,653,461
DRAWOFF TENSIONING MEANS FOR KNITTING MACHINES
Filed April 12, 1951 13 Sheets-Sheet 6

INVENTOR
Gottlob Bitzer
BY Earl S. Olson
ATTORNEY

Sept. 29, 1953 G. BITZER 2,653,461
DRAWOFF TENSIONING MEANS FOR KNITTING MACHINES
Filed April 12, 1951 13 Sheets-Sheet 7
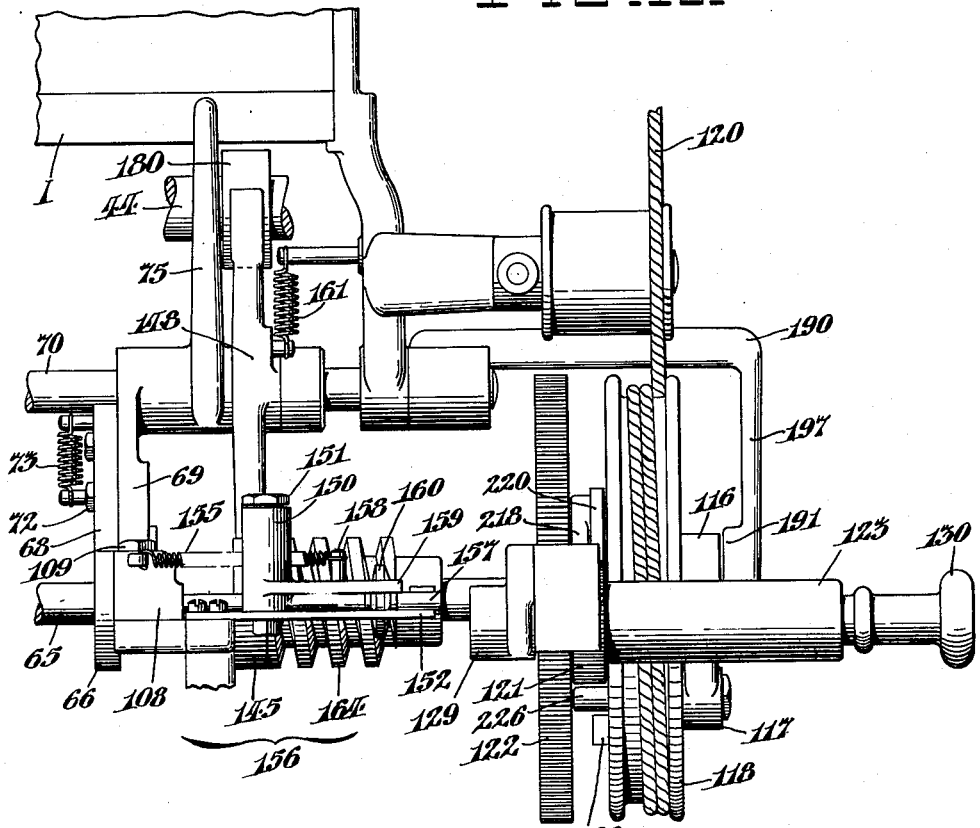
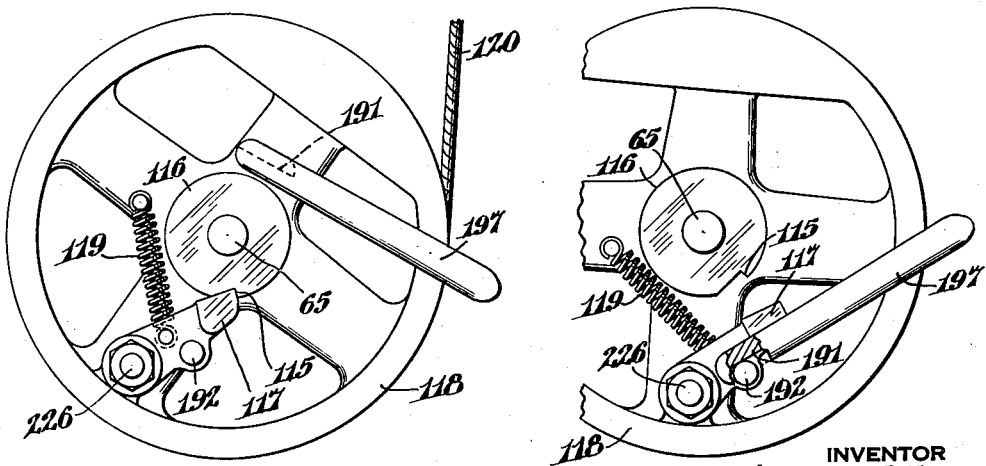
INVENTOR
Gottlob Bitzer
BY Earl S. Olson
ATTORNEY Sept. 29, 1953          G. BITZER          2,653,461
DRAWOFF TENSIONING MEANS FOR KNITTING MACHINES
Filed April 12, 1951          13 Sheets-Sheet 8
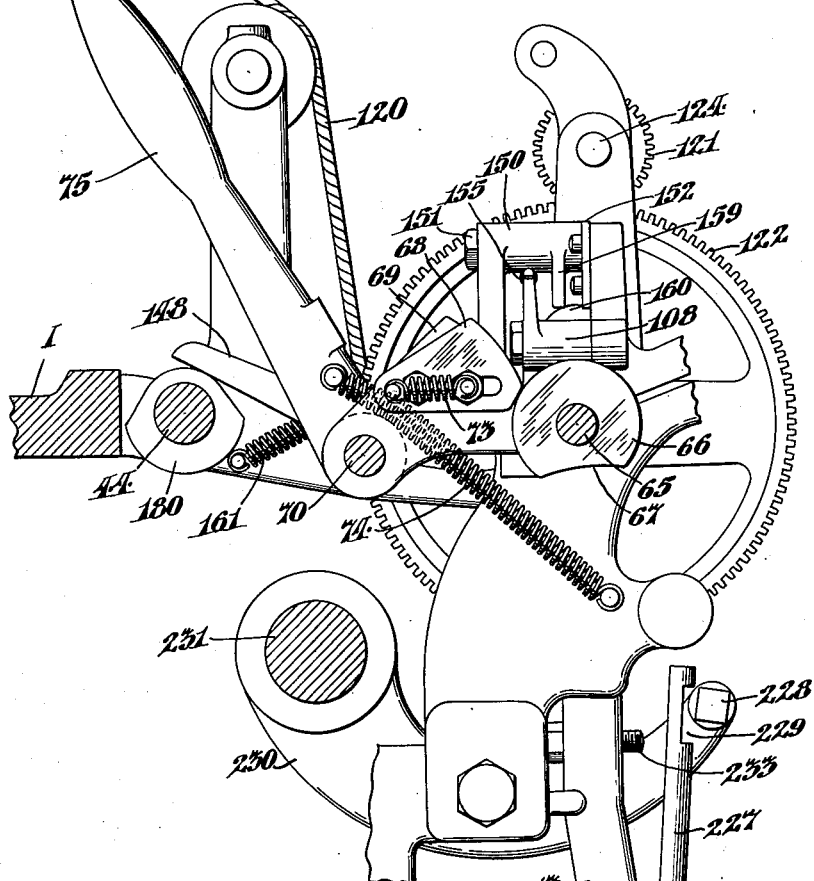
INVENTOR
*Gottlob Bitzer*
BY
ATTORNEY

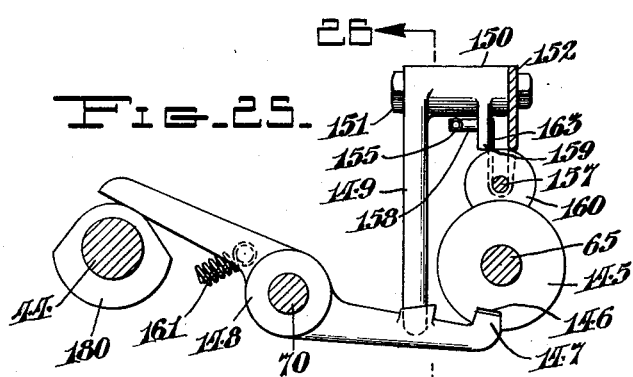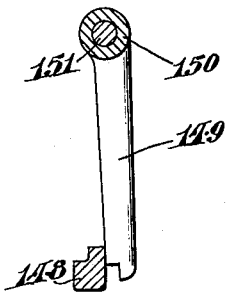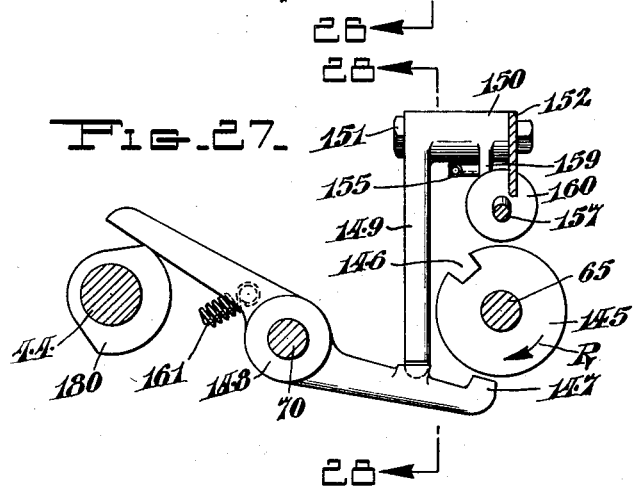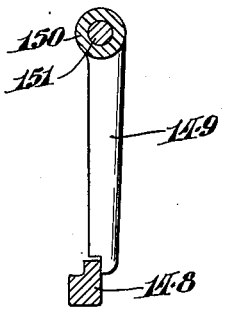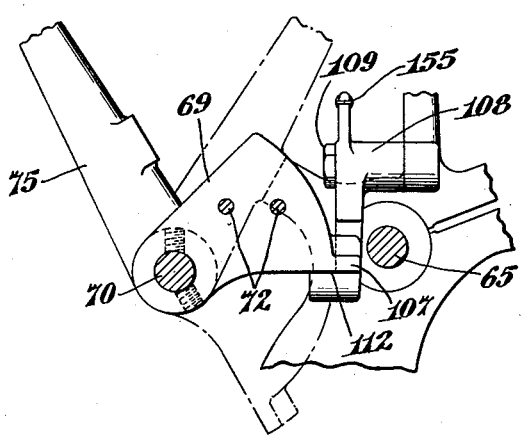

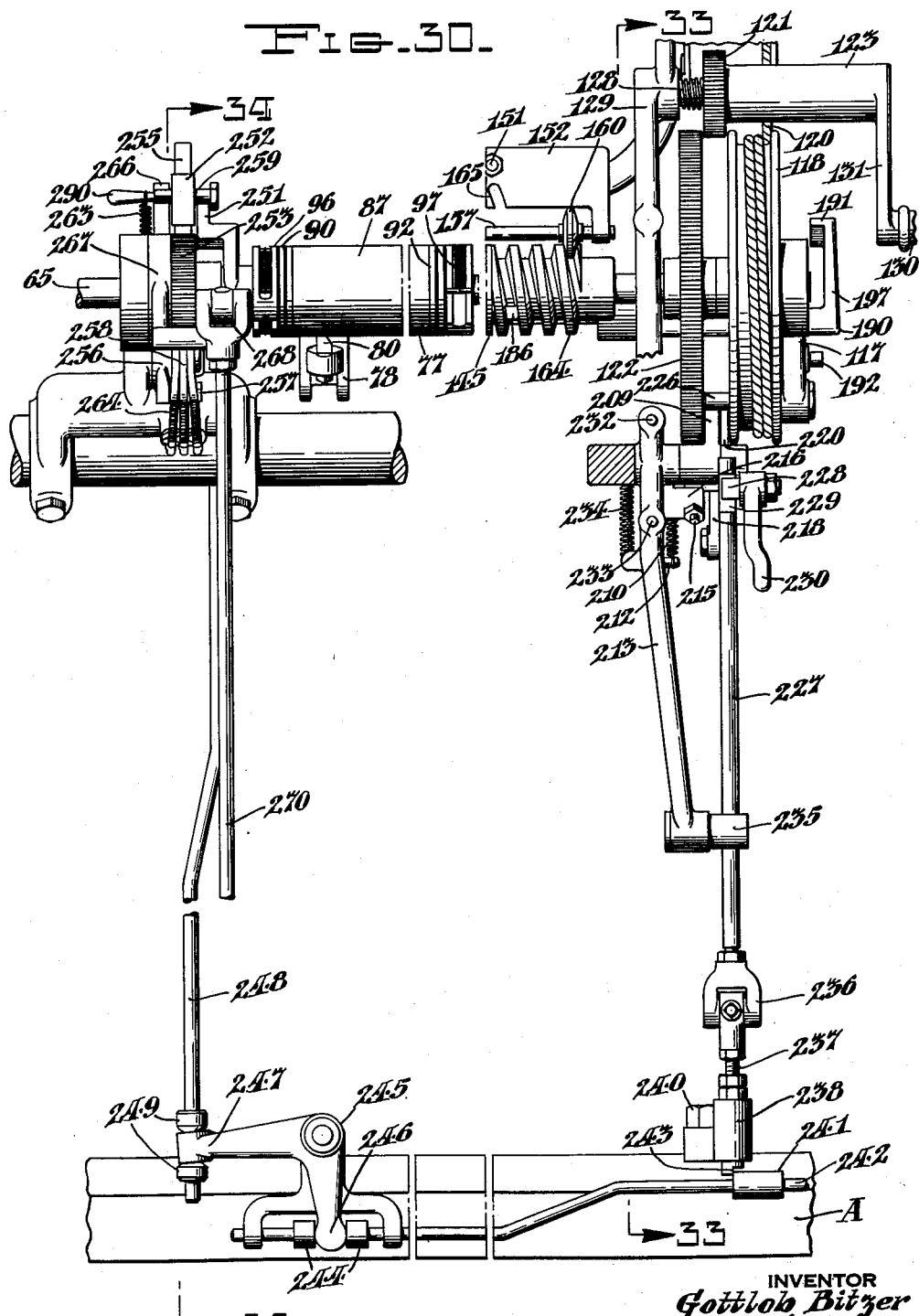

Sept. 29, 1953 G. BITZER 2,653,461
DRAWOFF TENSIONING MEANS FOR KNITTING MACHINES
Filed April 12, 1951 13 Sheets-Sheet 11
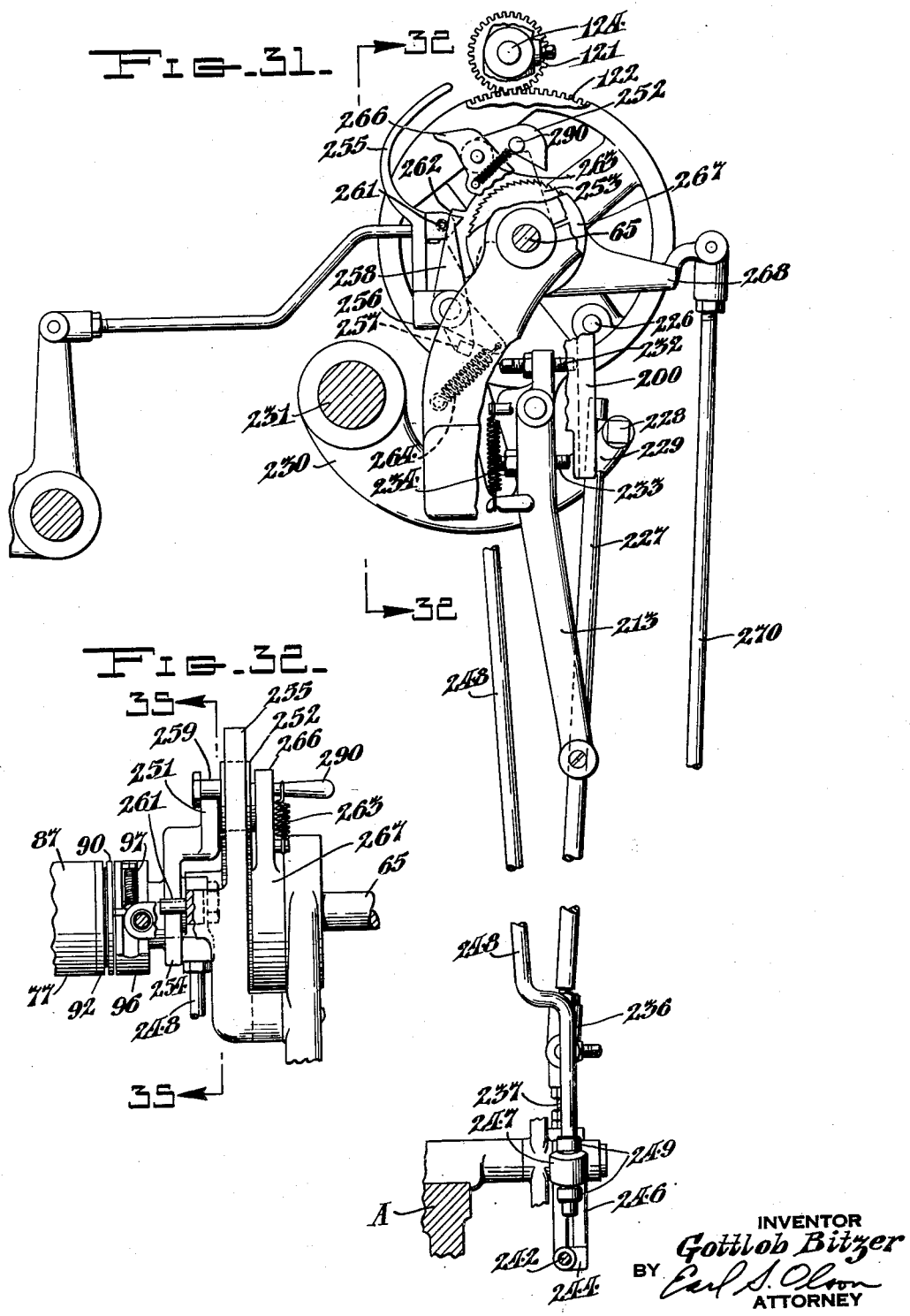
INVENTOR
Gottlob Bitzer
BY Earl S. Olson
ATTORNEY

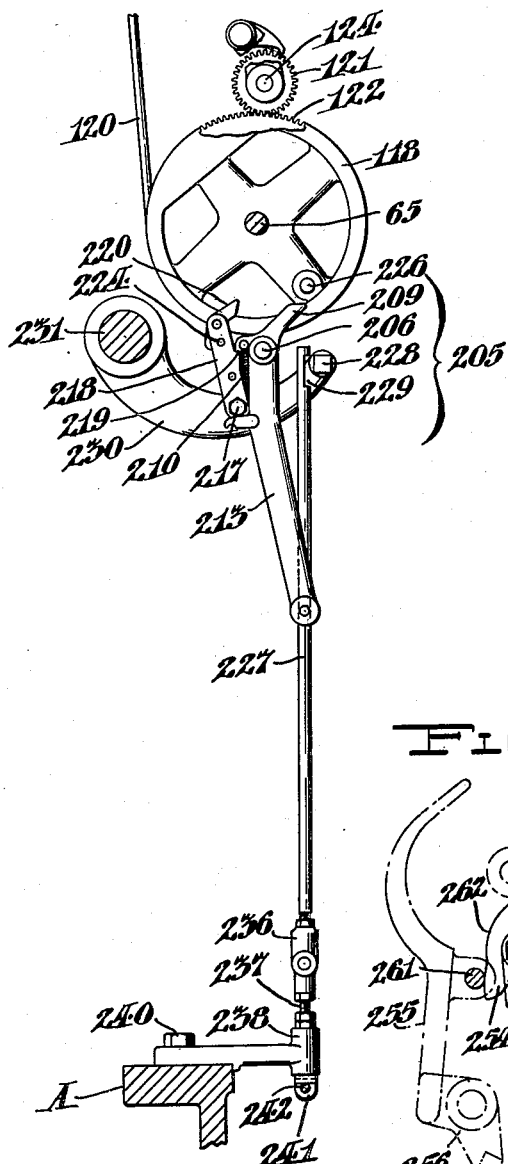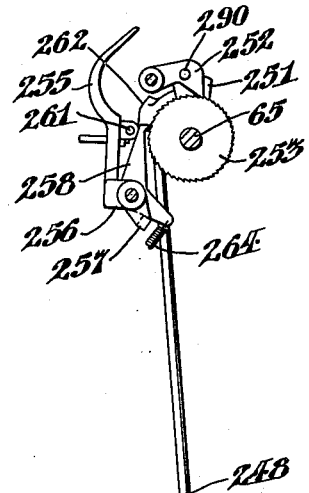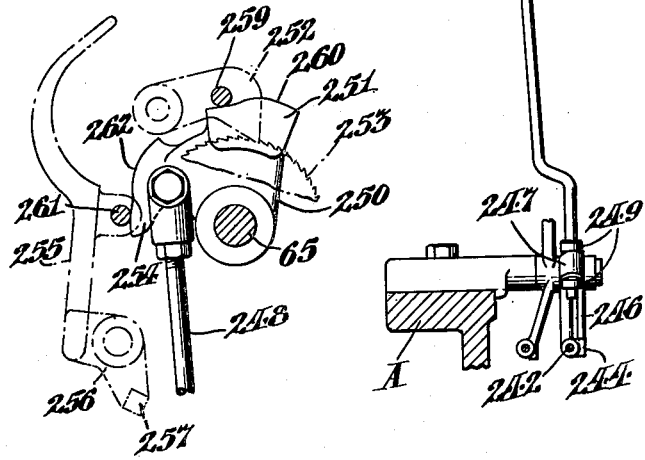

Sept. 29, 1953  G. BITZER  2,653,461
DRAWOFF TENSIONING MEANS FOR KNITTING MACHINES
Filed April 12, 1951  13 Sheets-Sheet 13
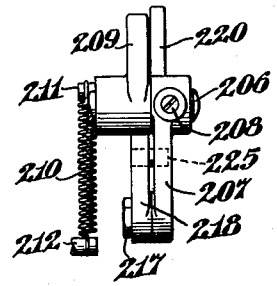
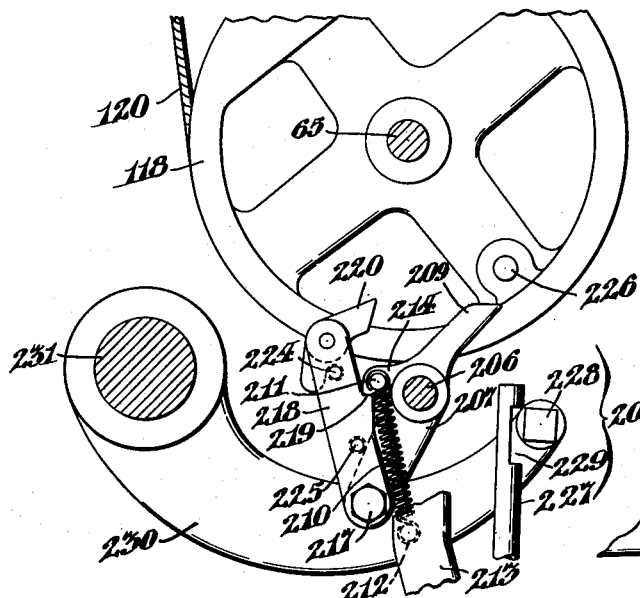
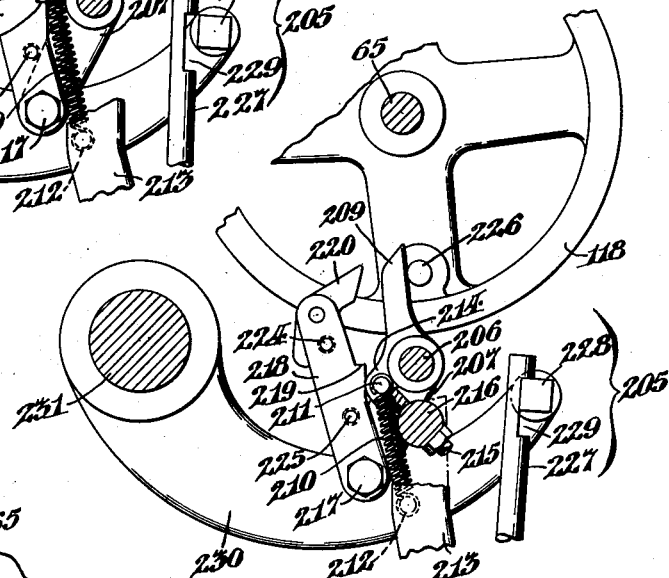
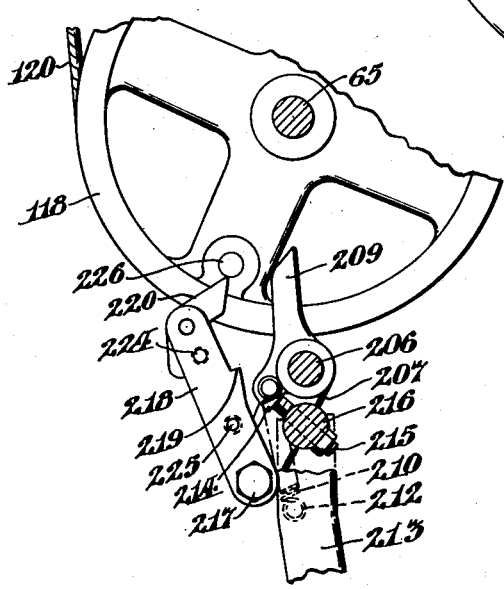
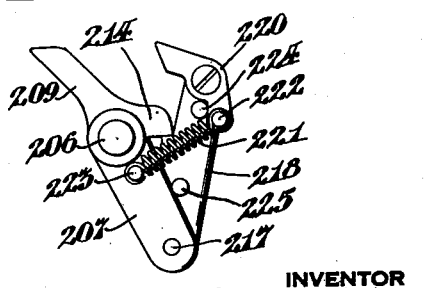
INVENTOR
*Gottlob Bitzer*
BY
ATTORNEY Patented Sept. 29, 1953

2,653,461

UNITED STATES PATENT OFFICE 2,653,461

DRAWOFF TENSIONING MEANS FOR KNITTING MACHINES

Gottlob Bitzer, Lincoln Park, Pa., assignor to Textile Machine Works, Wyomissing, Pa., a corporation of Pennsylvania Application April 12, 1951, Serial No. 220,563

38 Claims. (Cl. 66—96)

The present invention relates to straight, or full-fashioned knitting machines, and more particularly to means for automatically performing the welting operations, the tensioning and the draw-off of the fabric in the production of flat stocking blanks, or the like.

It has been proposed to economize time in hooking up the first courses in full-fashioned multi-section knitting machines by using a fabric draw-off reel comprising a roller for holding fabric so mounted on a draw-off shaft as to permit relative rotation between the roller and the shaft. The roller is temporarily latched in fixed angular position while straps connected to a welt or hook-up bar at one end and to the draw-off shaft at the other end are unwound and moved toward the needle row for hooking up the first course and for connection to the fabric for draw-off purposes, the shaft then being operated to draw off fabric for a time while the roller remains fixed. The draw-off roller is automatically unlatched from the shaft when the straps have been wound up to the same extent that they were originally unwound. Also, an arrangement has been proposed for running the hooks attached to the draw-off straps for acting on the welt wires toward the needle rows by mechanical means. However, no means has heretofore been disclosed whereby a plurality of such draw-off rollers could be latched to the shaft at one time by mechanical means operated from a given point or station, as is highly desirable in multi-section machines. Also, in said previously proposed welt-bar arrangement, the welt bar and its draw-off straps have been pulled away from the draw-off rollers by hand, for hooking up the loops of the first course by hand in the ordinary way, and no mechanical means has been provided for running the hooks and straps toward the needle row or for moving them mechanically and simultaneously as is highly desirable in multi-section machines. The draw-off rollers should all be latched simultaneously in a certain angular position and this is especially the case when it is necessary that the ends of the straps for the welt wires enter the draw-off rollers and are turned therefrom so as to enter guides for leading the hooks toward the needle row, as when the straps carry the hooks for the welt rods and the welts are turned automatically, but no such means have been proposed in either of said arrangements.

It is a principal object of the present invention to provide novel means for economizing time in connecting the draw-off straps to the welt wires in a multi-section full-fashioned knitting machine.

It is an object of the invention to provide a multi-section straight knitting machine having draw-off rollers mounted on the draw-off shaft so as to revolve relatively thereto with means for latching the draw-off rollers simultaneously in fixed position and for permitting the shaft to revolve relative to the draw-off rollers.

In order that a plurality of draw-off rollers may be latched simultaneously, it has been found necessary from a practical viewpoint to move the draw-off shaft to a given angular position, and it is an object of the invention to provide means for setting the draw-off rollers or draw-off shaft positively in a given angular position to facilitate simultaneous latching of the draw-off rollers in fixed position.

Another object of the invention is to provide means for locking the draw-off rollers each to one of certain members on the draw-off shaft and in a given angular position relative to such member and therefore to the draw-off shaft.

Another object of the invention is to provide unitary means for both positioning a plurality of draw-off rollers in a given angular position and for latching the draw-off rollers in such position.

Still another object of the invention is to provide means adapted to throw out of action a pawl for a draw-off means at the same time the draw-off rollers are released from the means for latching them in a given angular position.

A further object of the invention is to provide a novel, convenient, reliable and simple means whereby the draw-off shaft may be brought to a given angular position and latched in such position.

A still further object of the invention is to provide a reliable means for holding the draw-off rollers latched and for latching the draw-off shaft when the straps have been run out to the desired extent, and for automatically controlling the unlatching of the draw-off rollers and shaft.

It is now common practice to hook up and/or turn the welts of full-fashioned stockings automatically and it is another object of the invention to provide a novel means whereby a device for moving welt wire draw-off hooks into position for engaging a welt wire and for holding the hooks in such position for a time is coordinated with a hooking-up and/or welt turning mechanism.

Still another object of the invention is to provide a simple and reliable means for coordinating latching and unlatching of the draw-off shaft with latching and unlatching of the draw-off rollers relative to the draw-off shaft.

A still further object of the invention is to provide a novel and reliable means for shifting the drive of the main draw-off shaft from one motive means to another.

It has been found that, in a knitting machine having the different means mentioned for unlocking and locking the draw-off rollers, for running the hooks for the welt wires toward the needles and for latching the draw-off shaft and unlatching it, a maximum economy of time will be achieved by placing the operating or control parts of the various means all at a station where they are convenient to an operator near said station. It is therefore a further object of the present invention to provide a knitting machine with a station for the operator having one or more operating and control parts thereat.

With these and other objects in view, which will become apparent from the following detailed description of the illustrative and practical embodiment of the invention shown in the accompanying drawings, the invention comprises the novel elements, features of construction and combinations of parts in cooperative relationship, as hereinafter more particularly pointed out in the claims.

In the drawings:

Figure 1 is a sectional elevational view taken on a vertical plane intermediate the ends of a full-fashioned knitting machine within the invention, parts being omitted and parts being shown in section for purposes of illustration;

Fig. 2 is a fragmentary view in plan showing a knitting section of the machine of Fig. 1 and enlarged relative thereto, the parts being shown as they appear after a portion of a stocking welt has been knitted and a welt wire placed on the fabric;

Fig. 3 is an elevational view, with parts in section, of a portion of the apparatus shown in Fig. 2;

Fig. 4 is a sectional view taken substantially along the line 4—4 of Fig. 2, and drawn on a somewhat larger scale, relative to Fig. 2, the parts being shown in the positions shortly before putting a draw-off tension on the welt wires and while the draw-off rollers are latched;

Fig. 5 is a view similar to Fig. 4 but showing the parts just after the welt bar has been moved to an intermediate or "half-way" position and a draw-off tension applied to the welt wire, the draw-off rollers still being latched;

Fig. 6 is a view similar to Figs. 4 and 5 but showing the parts in the positions assumed after the welt bars have been disconnected from the fabric and the draw-off rollers unlatched and reconnected to their shaft;

Fig. 7 is a sectional detail view taken substantially along the line 7—7 of Fig. 2 of a welt bar and one of the pusher pins for moving the bar, the view illustrating the positions of the parts before the pin has come into position to move the bar;

Fig. 8 is a view similar to Fig. 7 but showing the pusher pin in position to operate the welt bar;

Fig. 9 is a sectional detail view of draw-off rollers and latching means taken substantially on the line 9—9 of Fig. 2, looking in the direction of the arrows;

Fig. 10 is a fragmentary view looking in the direction of the arrows 10—10 on Fig. 2, partly in front elevation and partly in sectional elevation;

Fig. 11 is a view similar to Fig. 10, but with certain of the parts in different relative positions;

Fig. 12 is a fragmantary sectional view taken substantially on the line 12—12 of Fig. 11 looking in the direction of the arrows;

Fig. 13 is a detail view in sectional elevation taken substantially on the line 13—13 of Fig. 2;

Fig. 14 is a fragmentary sectional elevation taken substantially on the line 14—14 of Fig. 2;

Fig. 15 is a sectional elevation taken substantially on the line 15—15 of Fig. 14 looking in the direction of the arrows;

Fig. 16 is a sectional detail view taken substantially on the line 16—16 of Fig. 2 looking in the direction of the arrows;

Fig. 19 is a plan view of the mechanism shown in Fig. 17;

Fig. 20 is a detail view taken in the direction of the arrows 20—20 of Fig. 17;

Fig. 21 is a fragmentary view similar to Fig. 20 with certain of the parts being shown in different relative positions;

Fig. 22 is an elevational view taken from the left of Fig. 17;

Fig. 23 is a fragmentary detail view of a portion of Fig. 22, the parts shown being, however, in different positions than in Fig. 22;

Fig. 24 is a sectional detail view taken substantially on the line 24—24 of Fig. 23, looking in the direction of the arrows;

Fig. 25 is a sectional detail view taken substantially on the line 25—25 of Fig. 17, looking in the direction of the arrows, parts being omitted for purposes of illustration;

Fig. 26 is a detail sectional view taken substantially on the line 26—26 of Fig. 25, looking in the direction of the arrows;

Fig. 27 is a view similar to Fig. 25, the parts being shown, however, in different relative positions;

Fig. 28 is a sectional view taken along the line 28—28 of Fig. 27;

Fig. 29 is a sectional detail view taken substantially on the line 29—29 of Fig. 17, looking in the direction of the arrows, certain of the parts being shown in different positions in dot-and-dash outline;

Fig. 30 is an elevational view taken from the right of Fig. 1, parts being omitted for purposes of illustration, and showing, particularly, parts of a weight motor for turning the draw-off shaft in the draw-off direction and parts of a spring motor for the same purpose together with parts of a means for automatically changing the drive of the shaft from the weight motor to the spring motor;

Fig. 31 is an end view taken from the left of Fig. 30, parts being broken away for purposes of illustration;

Fig. 32 is a detail view looking substantially in the direction of the arrows 32—32 of Fig. 31;

Fig. 33 is an elevational view taken substantially along the line 33—33 of Fig. 30 and on a slightly smaller scale than Fig. 30, parts being broken away for purposes of illustration;

Fig. 34 is a detail view on a smaller scale taken substantially along the line 34—34 of Fig. 30, parts being broken away and parts being omitted for purposes of illustration;

Fig. 35 is a fragmentary detail view taken substantially along the line 35—35 of Fig. 32, parts in front of the section line being shown in dot-and-dash outline;

Fig. 36 is a fragmentary view on an enlarged scale of a portion of Fig. 33, parts being broken away for purposes of illustration;

Fig. 37 is a detail view of certain levers and cooperating parts shown in Fig. 36, the view being taken from the right of Fig. 36;

Fig. 38 is a view of certain parts in Fig. 36, certain of the parts being shown in different positions relative to Fig. 36 and others being further broken away and shown in section for purposes of illustration;

Fig. 39 is a view similar to Figs. 36 and 38 with the parts being shown in different positions relative thereto; and Fig. 40 is a detail view of certain parts shown in Fig. 37 and taken from the right of said figure.

Figure 17:
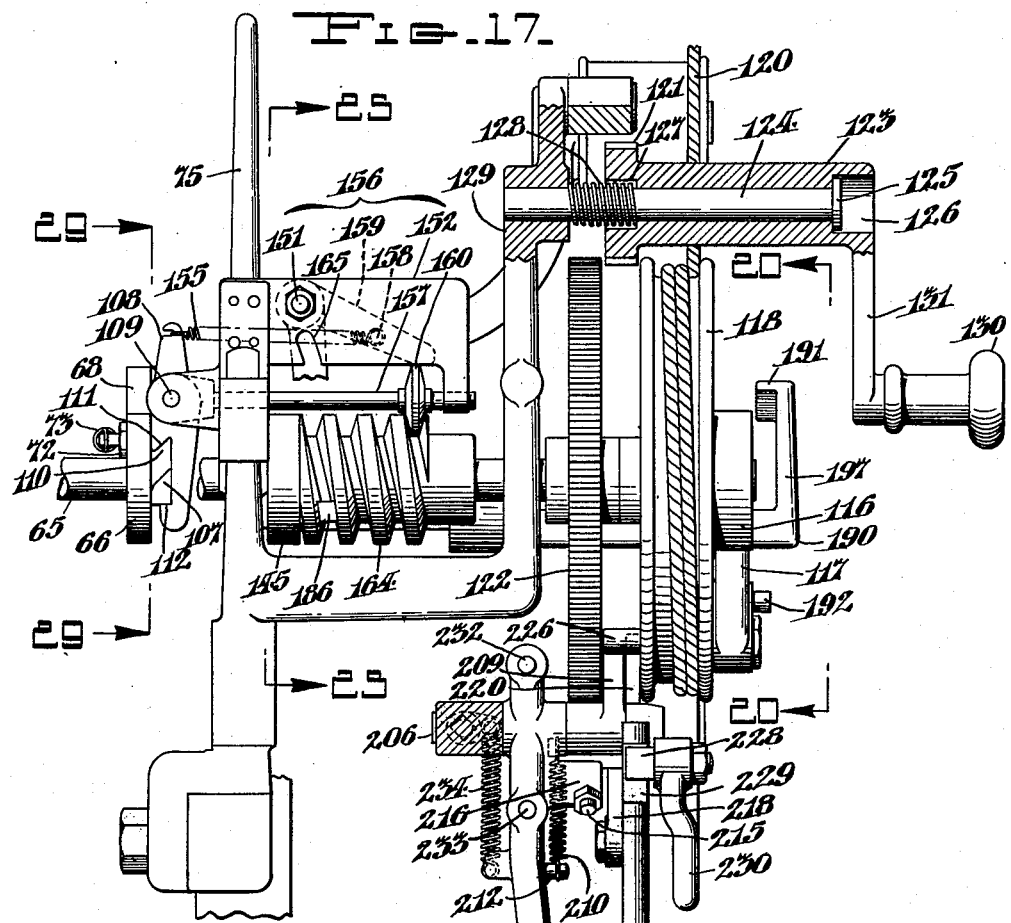
Fig. 17 is a front elevational view of a portion of the mechanism shown at the upper right hand of Fig. 1 and enlarged relative thereto, certain of the parts being broken away and others being shown in section for purposes of illustration.

In the drawings and description, only the means necessary to a complete understanding of the invention are specifically set forth; further information as to the construction and operation of other related, usual and well known knitting machine elements, mechanisms, etc., may be found in one or more of the following publications:

1. Pamphlet entitled—Full-Fashioned Knitting Machines—published and copyrighted by the Textile Machine Works, Reading, Pennsylvania, in 1920.

2. Four catalogs entitled—The "Reading" Full-Fashioned Knitting Machine Parts Catalog—published and copyrighted by the Textile Machine Works, in 1929, 1935, 1940 and 1947, respectively.

3. Booklet entitled—The "Reading" High Production Full-Fashioned Knitting Machine—which, forming a supplement to the above noted 1940 Parts Catalog of the Textile Machine Works, is a publication of the Textile Machine Works, copyrighted by the latter in 1940.

4. Pamphlet entitled—Knitting Machine Lectures—published by the Wyomissing Polytechnic Institute, Wyomissing, Pennsylvania, in 1935.

An apparatus of the invention provides means whereby a draw-off shaft for a plurality of knitting sections, together with draw-off rollers or reels for said sections normally locked to members on the shaft all in a given angular relation to their said members, may be set in a desired angular position, thereby permitting all the draw-off reels to be unlocked from the shaft at one time. The invention further permits the draw-off reels all to be latched against rotation at substantially the same time. Unlocking the draw-off reels from the shaft and latching them against rotation may be accomplished simultaneously by a unitary device although it is within the invention to carry out these acts successively and by separate means. The draw-off means within the invention preferably includes an auxiliary draw-off shaft which acts at the time of hooking up the first course of a fabric and for a relatively short portion of the time required for knitting a blank. It also includes a main draw-off shaft which has pairs of straps attached thereto at their one ends, said straps carrying at their other ends hooks for engaging the welt rods or wires used in drawing off the fabric blanks during the knitting of a portion of the welt and also during the knitting of the greater portion of the fabric after the fabric has once been folded over the welt wires and the welts have been turned. In operation, the fabric draw-off reels having been unlocked from the draw-off shaft and then latched in a given fixed position, the main draw-off shaft is turned to unwind the straps from the shaft whereby the hooks are pushed toward the needles to a definite point. When the hooks reach this point the turning of the shaft is positively stopped and the shaft locked for a time. The welt wires having been put into position, the main draw-off shaft may then be unlocked and said hooks drawn forward to engage the welt wires by means acting on the shaft to draw-off the fabric.

Although not essential to certain aspects of the invention, preferably the unlocking of the main draw-off shaft is done automatically and by means coordinated with a combined means for hooking-up the first course of loops and for turning the welt. Assuming the knitting machine is equipped with a hooking-up and/or a welt turning means, it is preferred not only that the draw-off shaft be unlocked by the welt turning means but that the draw-off means be of a type having a plurality of motive means. By the time sufficient fabric has been knitted to wind the straps back on said draw-off shaft to the point at which they were when the draw-off rollers were unlocked from the shaft, the operation of the draw-off shaft is taken over automatically by a motive means other than that in action at the time the draw-off tension is first applied to the welt wires, a novel change over means for this purpose being used in the arrangement disclosed herein. Preferably, said change over from one motive means to another comes sometime before the draw-off rollers are unlatched and reconnected to the draw-off shaft.

Referring more particularly to the drawings, a portion of a full-fashioned knitting machine 50 is shown in Fig. 1. Machine 50 comprises a frame 51 which includes a series of transverse frames F rigidly connected by longitudinally extending front beam A, a back beam B, a center bed C and a front bed or table I. The machine 50 also includes a cam shaft S and a usual and well known pattern means, not shown, for automatically controlling certain functions of the machine. Also on frame 51 are mounted a plurality of similar knitting sections one of which is shown at 52 (Fig. 2). Section 52 includes a row of spring beard needles 53 and the machine includes means whereby yarn is laid on the beard side of the needles of each knitting section and is sunk between the needles by sinkers and dividers D to form loops to be knitted thereby. Mechanisms for these purposes are well known and will not be further referred to in detail. However, it is the general practice to knit straight or full-fashioned hosiery initially as flat fabric blanks and to begin a new blank for each stocking. Therefore, when yarn is laid to the needles of a knitting section for the first course of a blank, a welt hook bar 55 is employed (Fig. 2), the hooks 54 of which are engaged with the yarn of the first course and the bar put under a draw-off tension to knit the first part or welt of the stocking. After a certain amount of fabric has been knitted it is the custom to turn the welt, that is to restore the first course to the needles, to form a two ply fabric and to lock the loops of the first course. The section 52 is shown as including a portion of an automatic hook-up and welt turner of a type shown in my prior Patent No. 2,413,601, issued December 31, 1946. As is generally the case when the welt is turned automatically, the loops of the first course in each section are hooked up or engaged automatically by the hooks 54 on the welt bar 55 in the arrangement shown. For this purpose the welt bar 55 is advanced automatically at about the time the loops of the first course are "divided" by the usual dividers so that the loops are pulled down onto hooks 54 when the needles draw the loops off the ends of the sinkers and dividers.

The means in the arrangement shown for advancing the bar 55 for hooking up the first course comprises levers 56 which have arms 57 pivoted thereon and extending from their pivots toward the needle rows, the end of each arm 57 farther from levers 56 being forked as shown in Fig. 2 and having a pin 59 therein which extends across a rail 58, there being one pair of each of levers 56, arms 57, pins 59 and rails 58 for each knitting section. Pins 59 slide on the tops of rails 58 and, intermediate the ends of the outer prongs of arms 57 and the outer vertical sides of rails 58, pins 59 pass through sliders 49 which slide in contact with the outer vertical faces of the rails 58 (Fig. 16) and have inturned flanges 48 at their lower edges which extend into horizontal slots 47 which extend longitudinally of rails 58. Sliders 49 thereby resist any tendency which may arise at times for the arms 57 to lift pins 59 from rails 58. Sliders 49 also have extensions 46 fixed to their upper edges along the parts thereof nearer the needle row, extensions 46 being bent over so that they project laterally from the bodies of the sliders above the ends of the welt bars 55 to prevent the welt bars from tilting when being pushed toward the needles. The prongs at the ends of levers 57 are formed to provide flat heads 45 one head contacting one side of the rail and the other head contacting the slider 49, to prevent movement of pins 59 laterally of rails 58. Pins 59 of each pair project laterally toward each other beyond the inner prongs of levers 58 and are adapted to engage in sockets in members 60 fixed to the bar 55 near its ends, as shown in Fig. 2. The socket 99 of each member 60, shown in Figs. 4 to 8, inclusive, is adapted to resiliently engage a substantial portion of the circumference of the pin 59 and provides a releasable connection between the pin 59 and the member 60. At the desired time, levers 56 are turned in the direction to move pins 59 toward the needle row so as to push bar 55 against a stop to position the welt hooks 54 between the needles to receive the loops of the first course. After the loops of the first course have been received on hooks 54, the levers 56 are turned in the opposite direction to withdraw pins 59 away from the needle row, this action, due to the resilient connection between the pins 59 and sockets 99, also withdrawing the bar 55 to engage the hooks with the newly formed loops and providing an initial tension on the loops until the draw-off means acts thereon. Continued movement of the levers 56 to their inactive position breaks the connection between the sockets 99 and pins 59. For turning levers 56, a shaft 44 is provided to which they are fixed, shaft 44 being turned automatically to the degrees needed at desired times by means forming no part of the present invention but which may be such as that used for the purpose in said Patent No. 2,413,601.

In the arrangement shown, the draw-off means which is first active includes a strap 61 (Fig. 2) for each welt bar 55 shown as connected at one end to the center of the bar. The other end of each strap 61 is connected to a drum 62 connected to an auxiliary shaft 63 which is operated by a weight (not shown) at the end of the machine which is at the left when the observer faces the needle row.

After knitting has begun, the main draw-off shaft 65 is first set in a given angular position for purposes hereinafter set forth, and is then turned to advance hooks 64, for drawing-off fabric by means of welt wires, a pair of hooks 64 being provided for each knitting section. The means for determining the initial position of the shaft 65 include a disk 66 (Figs. 22 and 23) on the shaft 65, disk 66 having an arcuate recessed surface 67. A cam piece 68 has an arcuate active face 79 adapted to be registered with surface 67. Cam piece 68 is mounted on an arm 69 fixed to a shaft 70 having a hand lever 75 thereon. Piece 68 has a slot 71 therein extending generally radially of shaft 65. Pins 72 fixed to arm 69 extend through slot 71 (Fig. 24) whereby piece 68 is permitted to slide on arm 69 somewhat radially of shaft 70 when piece 68 passes from a position above disk 66 to one below it. A spring 73 connected to the piece 68 and one of the pins 72 acts to yieldingly press piece 68 outward from shaft 70. A spring 74 (Fig. 22) acts to turn shaft 70 in a direction to carry arm 69 down from the position shown in Fig. 22 to that shown in dot-and-dash outline in Fig. 29 so that piece 68 will generally lie below the position occupied by it in Fig. 23. When it is desired to move arm 69 and piece 68 from their positions below the shaft 65 and disk 66 and to place shaft 65 in a predetermined angular position as shown in Fig. 23, the handle or lever 75 is pressed toward the left from the dot-and-dash outlined position as viewed in Fig. 29 to lift piece 68. In general, the disk 66 will not be in said predetermined position and, as piece 68 rises, the upper corner 76 of piece 68 will strike against the circular portion of disk 66 and prevent further movement of handle 75. While maintaining the parts in this position the shaft 65 is manually turned until corner 76 engages surface 67. Whereupon with continued movement of handle 75, the shaft 65 is turned until it is positioned as shown in Fig. 23 and draw-off rollers or reels 77 (Figs. 9 and 10), releasably connected to the shaft 65 at this time, are also predeterminedly positioned with the shaft 65 for purposes hereinafter set forth.

For disconnecting draw-off reels 77 from shaft 65 and also for latching them in the positions each assumed when shaft 65 was brought to said predetermined position, shaft 70 has fixed thereon a set of arms 78, one of which appears in Figs. 9 and 10 and each of which has a wedge or cam member 80 fixed thereon which is adapted when shaft 65 is in said predetermined position to enter a longitudinal slot 81 in a draw-off reel 77. It is evident that the reels should be held so that each slot 81 is in a given angular position to permit wedge or cam member 80 to enter the slot and for this purpose a locking device such as 82 is provided intermediate each draw-off reel 77 and shaft 65. Each lock 82 is shown as comprising a locking member or bolt 83 mounted partly in an outwardly pressed groove 84 in shell portion 87 of the draw-off reel 77 and partly in the outer cylindrical portion of an end disk 88 to which shell 87 may be riveted as shown or otherwise suitably fastened. Disk 88 has a central section serving as a journal for the draw-off reel. Each bolt 83 is urged outwardly, that is to the left as viewed in Figs. 10 and 11, by a spring 85 formed by a U-shaped loop of wire (Fig. 9), the bridge of the U of said spring lying in contact with an up-turned part 89 at the inner end of bolt 83 while the ends of spring 85 embrace shaft 65 and are fixed in disk 88. When free to move under the influence of spring 85, the outer end of bolt 83 enters a slot 86 in an annular flange 90, see Fig. 12, which projects outwardly from a cylindrical member 91 which is shown as lying principally within a cylindrical extension 92 which projects axially of shaft 65 from the outer face of disk 88.

Cylindrical member 91 is mounted on the outer cylindrical race of a ball bearing 93 so that the outer race and member 91 may turn together, the inner race of the ball bearing 93 being fitted to shaft 65 so that the inner race turns with the shaft. Further, the flange 90 of member 91 is provided with pins 94 projecting therefrom parallel to shaft 65. For connecting part 91 to the shaft 65, the pins 94 extend into segmental notches 95 in the circumferential edge of a disk member 96 fixed to shaft 65 to revolve therewith as shown in Fig. 13. Springs 97 are connected between pins 94 and pins 98 fixed to the member 96, providing a resilient connection between the part 91 and disk member 96. The springs 97 lie in cut-away portions 193 of the member 96. Notches 95 have bottom surfaces 194 and end walls 196, the end walls limiting the relative movement between the cylindrical member 91 and disk member 96. With this arrangement the angular relation between the member 96 and member 91, or between the member 96 and the draw-off reel 77 when it is locked to member 91, may be changed to a limited extent permitting the springs 97 to compensate for any slight differences in the lengths of the loops formed on the different knitting sections of the machine without substantially varying the tension in the fabrics in such knitting sections.

The locking members 83 are slotted as shown at 100 so as to receive one of the operating wedges or cams 80. As is clear from Figs. 9 and 10, the shell 87 of the draw-off reel and the disk member 88 are both slotted in radial alinement with the slot 100 so that wedge 80 can move radially into the interior of reel 77 far enough to effect an unlocking movement of bolt 83. This occurs as the handle 75 is pushed to its extreme position in the counterclockwise direction as viewed in Fig. 22.

As is best shown in Fig. 9, each arm 78 is journalled on shaft 70 and is moved in the direction to cause its wedge 80 to unlock draw-off roller by a resilient connection to shaft 70 furnished by a spring 101 connected between a pin 102 on arm 78 and lug or hook 103 on a collar 104 fixed to shaft 70. Therefore, if the draw-off rollers are not in position for the tips of wedges 80 to be received in the slots 100 of bolts 83, and the wedges are against the draw-off rollers, no damage will result from a continued turning of shaft 70 because springs 101 will yield. The springs will, however, press the wedges 80 into the slots 100 to unlock the draw-off rollers as soon as the rollers have been turned into the required angular position. When shaft 70 is turned in the opposite direction to withdraw wedge members 80 from the draw-off rollers, a lug 105 on collar 104 engages a pin 106 on arm 78 so that the arm is moved positively with the shaft 70.

Figure 18:
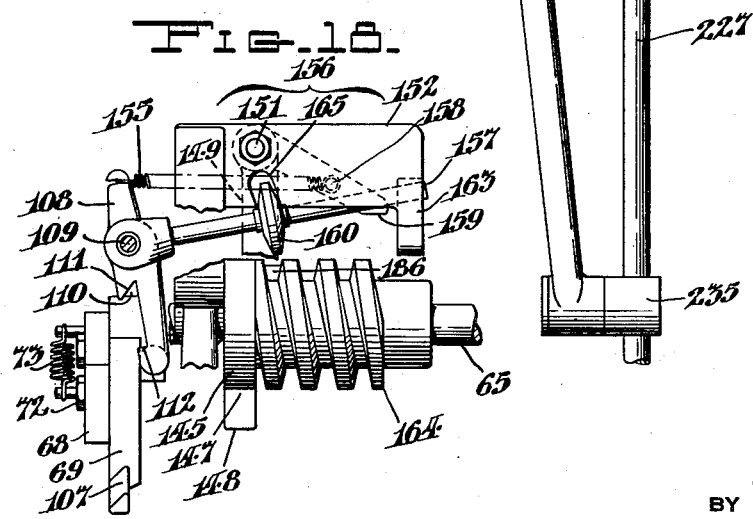
Fig. 18 is a detail view of a portion of Fig. 17 with certain of the parts being shown in different positions relative to Fig. 17, and others being broken away for purposes of illustration.

As the handle 75 is pushed to its extreme position in the counterclockwise direction as viewed in Figs. 22 and 23, not only does shaft 70 move each wedge 80 to its extreme position to release the draw-off rollers from the shaft and to latch them against turning, but it moves arm 69 to a position shown in Fig. 22 in which cam piece 68 is out of contact with the arcuate recess 67. While this final movement of handle 75 and shaft 70 is taking place, a wedge 107 at the outer and lower end of arm 69 is moved up so as to operate a latch to hold arm 69 and shaft 70 stationary for a while to retain the draw-off rollers in latched position. As best shown in Figs. 17, 18 and 29 said latch for shaft 70 comprises a generally vertical latch lever 108 mounted to turn on a bolt 109 lying above and at right angles to shaft 65, bolt 109 being fixed in a part rigid with the machine frame. Lever 108 is cut out between its axis and its lower end to provide a recess 110 having a reentrant inclined surface 111 at its upper end complemental to the surface of wedge 107 and adapted to be engaged by such surface of wedge 107 as it rises so as to swing the lower end of lever 108 toward the lever 69. The cut-out in lever 108 also provides a shoulder 112 which acts as a latch for arm 69. That is, as the lower end of lever 108 moves toward the arm 69, due to the interaction of wedge 107 and the undercut surface 111 of recess 110, the shoulder 112 passes beneath arm 69. As the pressure on handle 75 is relaxed, the spring 74 connected to the lever 75 draws the shaft back so that arm 69 rests on shoulder 112 as best shown in Fig. 17, thereby latching shaft 70 in the position shown in Fig. 29.

When, as described above, the reels 77 have been unlocked from shaft 65 and the lever 75 and cam piece 68 latched in the position of Fig. 22 so that the cam piece will not interfere with disk 66 on the shaft 65, the shaft 65 may be turned in the direction opposite to that in which it revolves in drawing off fabric until a shoulder 115 on a disk 116 (Figs. 20 and 21) fixed on the shaft 65 at the right hand end thereof as viewed in Fig. 17, comes into contact with a driving pawl 117 on a driving sheave wheel 118 journalled on shaft 65 just inside the disk 116. Pawl 117 is pivoted on wheel 118, and a spring 119, having its ends connected to the pawl and to wheel 118 respectively, urges pawl 117 toward the disk 116 whereby the pawl 117 contacts the shoulder 115 as the shaft 65 is turned. Upon engagement of the pawl and shoulder, wheel 118 turns with the shaft. Turning shaft 65 and wheel 118 winds up a rope 120 on the wheel, one end of which is fixed to the wheel 118 and the other end of which is fixed to a weight W (Fig. 1) which is adapted to act, after rope 120 has been wound up a certain amount, to turn shaft 65 in the draw-off direction during a portion of the time taken to knit a stocking blank. The shaft 65 is turned to wind the rope 120 upon the wheel 118 by a pinion 121 which is engageable with a gear 122 fixed to shaft 65. As shown in Fig. 17, pinion 121 is formed at the inner end of an elongated hub 123 which is mounted to revolve on an axle 124 the left end of which, as viewed in Fig. 17, is fixed in a portion of the frame. Hub 123 is not only rotatable on axle 124 but may move axially thereof to a point defined by a head 125 at the right or free outer end of axle 124. Hub 123 has sockets 126 and 127 respectively at its outer and inner ends. Spring 128 surrounding axle 124 between a frame part 129 and the face of socket 127 normally presses hub 123 to a point at which head 125 engages the inner face of socket 126. This position of the parts is shown in Fig. 17 and is one in which pinion 121 is disengaged from gear 122. The hub 123 is also provided with a crank arm 131 to which a handle 130 is pivoted. In order to wind up rope 120, therefore, the operative presses on the handle 130 on the crank 131 at the outer end of hub 123 to move the teeth of pinion 121 into engagement with those on gear 122 and then turns the crank to turn the shaft 65 and wheel 118 as hereinbefore set forth.

At the time rope 120 and its weight are wound up, shaft 65 is necessarily turned in a direction opposite to that in which it moves when drawing off fabric and this fact is made use of in the arrangement shown to move the hooks 64 toward the needles 53 into position for engagement with and for drawing off a welt wire 136. For this purpose each hook 64 is attached to one end of a semi-rigid strap like member 133 which is provided with openings 142 for engagement with round projecting heads of a series of spaced pins 140 carried on the cylindrical member 91, this arrangement providing a sprocket-like drive for winding the straps upon the member 91, for moving the hooks 64 in the take-off direction and for unwinding the straps from the member 91 when advancing the hooks 64 in the position shown in Fig. 14. The extension 92 of disk 88 and shell 87 of the draw-off reel 77 is provided with an aperture 141, as shown in Fig. 14, to permit passage of the strap 133 during the winding or unwinding action. The disk 88 is also provided with a shouldered portion 137 and a rivet-like member 138 (Fig. 10) adjacent the aperture 141 for preventing the strap 133 from uncoiling and breaking during engagement with the pins 140 when the strap is wound upon the member 91 and no tension is applied thereto.

In order to guide the straps 133 in advancing the hooks 64 to the position of Fig. 14, a guide 143 is provided for each strap and supported from the rail 58 by means of plate members 139. As shown in Fig. 15, the guide 143 for each strap 133 is of a shallow somewhat box-like conformation in cross-section, the top of the guide structure being slotted at 144 to permit the hook 64 to travel along the guide. In order to stiffen the straps 133, each one preferably is rolled so that it has a transverse curve or bow when free from member 91, as shown in Fig. 15, the interior of guide 143 affording sufficient space vertically for the bowing of the straps. The bowing of the straps stiffens it against thrust in the direction of its length. However, the invention is not limited to transversely curved straps in all cases. Straps 133 as shown are made of sheet metal, but any material adapted to transmit the necessary thrust to the hooks 64 may be used.

In order to prevent, when turning handle 130, the hooks 64 from running too far toward the needle row and especially to prevent the hooks from interfering with the needles, means is provided within the invention whereby the movement of hooks 64 toward the needles is stopped at a definite point. For this purpose, shaft 65 has a disk 145 fixed thereon which has a generally rectangular or channel shaped notch 146 therein, as shown in Figs. 25 and 27. Notch 146 is so located that when hooks 64 have reached a desired point, notch 146 is in position to be engaged by an upturned latch finger 147 at one end, the right end as shown in Fig. 25, of a lever 148 which is pivoted near its middle on shaft 79. A spring 161 (shown in Fig. 19) acts on lever 148 to urge finger 147 into notch 146 and thereby lock shaft 65 in the position shown in Fig. 25. In order, however, that lever 148 may not lock shaft 65 at undesired times, lever 148 is normally latched so that its finger 147 is held out of engagement with notch 146. For this purpose, an auxiliary latch lever 149 is provided which, as shown in Figs. 25 to 28 inclusive, is mounted to swing in a vertical plane at right angles to the plane of movement of lever 148. As shown, lever 149 depends from a hub 150 pivoted on the shank of a bolt 151 mounted on a plate 152 which is fixed to the frame of the machine (Figs. 19 and 22). When finger 147 is engaged with notch 146, lever 149 is held against the side of lever 148 as shown in Fig. 26 by a spring 155 (Fig. 19) so that lever 149 will snap into the position shown in Figs. 27 and 28 in which lever 148 is latched in inoperative position, after lever 148 is moved to unlatch shaft 65 in a way which will hereinafter appear.

In order to control the movements of auxiliary latch lever 149 and to properly coordinate its movements with those of shaft 65 and hooks 64, the spring 155 is included in a control device 156 which also includes the lever 108.

Spring 155 is shown as connected at one end to the upper end of the lever 108 and at its other end to a pin 158 (Figs. 17 and 18) fixed intermediate the ends of an arm 159 which is fixed at one end to hub 150 (Fig. 22) to which auxiliary latch lever 149 is also fixed. Also included in said means 156 is a traveller 160 shown as a disk mounted on a pin or shaft 157 and slidable lengthwise of the pin. One end of pin 157 is fixed to the latch lever 108 while the other end is free except that it is guided in a channel portion 163 at the lower right hand corner of plate 152 as viewed in Fig. 25. Now when latch lever 108 is in the position shown in Fig. 18 in which arm 69 is unlatched, the outer or free end of pin 157 is elevated and traveller 160 is held out of contact with a worm 164 on shaft 65 by which the traveller 160 is moved along its pin 157 for purposes which will presently appear. At the beginning of a cycle, the parts in question are in the position shown in Fig. 18 in which lever 108 and pin 157 are turned counterclockwise as far as possible. In these positions, traveller 160 lies above the left end of worm 164 and extends into a recess 165 in plate 152. When, however, shaft 65 has been turned into position such that cam piece 68 can enter recessed surface 67 to turn the shaft to the desired position and arm 69 then raised, wedge 107 turns lever 108 to the vertical position and thereby brings pin 157 horizontal while disk 160 is brought down into the groove of worm 164, parts 108 and 157 being then latched to remain in this position for a while by engagement of shoulder 112 on lever 108 with the underside of arm 69, as previously described. Disk 160 being in the groove of worm 164, the disk is pushed along in the direction from left to right as viewed in Fig. 17 by the worm as shaft 65 is turned to move hooks 64 toward the needles. At this time the auxiliary latch lever 149 is in the latching position shown in Figs. 27 and 28, latch finger 147 is in the position in which it will not interfere with turning shaft 65, and arm 159, which is rigid with the hub 150, is in the position shown in Fig. 18. As disk 160 moves along the worm 164, its upper edge contacts the lower end of arm 159 and moves it to the position shown in Fig. 17, thereby releasing lever 148 from auxiliary latch lever 149. This occurs just as hooks 64 are approaching the ends of their paths toward the needles and consequently the finger 147 rises into latching engagement with disk 145 and engages notch 146 almost immediately afterward, thus stopping the shaft 65. At this time, latch levers 148 and 149 are in the positions shown in Figs. 25 and 26 while hooks 64 are in the position shown in Fig. 14.

In the meantime, the machine has been knitting the welt fabric and as soon as the hooks 64 have been run toward the needles, a welt wire 136 is placed on top of the fabric and its ends inserted in slots 166 in the rails 58 in position preparatory to its engagement with hooks 64 and also to turning the welt. The slots serve to guide the welt wire during a part of its take-off movement, as shown in Figs. 4, 14 and 15. To facilitate the placing of the welt wires in slots 166, a means is shown which preferably includes substantially U-shaped members 170 (Fig. 15) having leg portions 171 and 172 and cross-pieces or bridge portions 173 at their lower ends. The rails 58 of each knitting section have inclined slots in the facing vertical sides thereof, one such slot being shown at 174. The legs 172 lie in the slots 174, while the legs 171 contact the opposite vertical sides of the rails 58. Rails 58 have projections 175 with lower ends at right angles to the edges of the slots 174. Each bridge portion 173 is adapted to contact the lower end of a projection 175 to limit the movement of a member 170 upwardly in its slot. Normally each member 170 is pressed upwardly in its slot 174 by a compression spring 176 which surrounds the shank of a bolt 177 which extends through an aperture in the bridge portion 173 and is threaded into projection 175 (Fig. 15). Each spring 176 thrusts at one end against the bottom of a socket sunk in a bridge portion 173 and at the other end against the head of its bolt 177. The upper end of each leg 172 of U-members 170 is cut off on a line inclined downwardly as shown at 178 to provide a notch or recess at the upper end of each slot 174 into which a welt wire 136 may be readily inserted. Then by pressing down on such wire the spring 176 is compressed to permit the ends of the welt wire to move downward along the edges of slots 174 into the longitudinal slots 166. As is best shown in Fig. 15, each leg 172 of a U-member 170 is slotted as shown at 179 to afford a connecting slot between the sections of the slot 166 on each side of member 170. Therefore, when once a wire 136 has entered slot 166 and springs 176, being thereby released, have returned the members 170 to the position shown in Figs. 14 and 15, the wire can be moved toward the hooks 64 to the extent desired. As shown in Figs. 4 and 14, an end of the wire has been brought to rest in the slot 179 of a U-member 170, a short distance in front of hooks 64.

During the time the hooks 64 and the welt wires 136 have been positioned as in Figs. 4 and 14, the machine has been knitting a portion of the welt fabric and, assuming that the machine has a welt turning mechanism according to said Patent No. 2,413,601, the welt turning mechanism is usually operated soon after the wires have been put in position to move the welt bars part way back toward the needles from the point they had reached, and to hold the welt bars in such intermediate or "half-way" position for a time. The positions of the hooks 64, wires 136 and welt turner parts involved just prior to moving the bar 55 to said half-way position are shown in Fig. 4 and the position of the parts as the bar arrives in said half-way position are shown in Fig. 5. As is clear from the drawings, each welt wire is held by members 170 at a level below the plane of the welt hooks 54. Therefore, when the welt bar is pushed rearwardly toward the needle row, the welt hooks carry the fabric edge attached thereto above the welt wire to form a fold in the fabric preparatory to turning the welt and, at the same time, draw the loops of the first course away from the hooked ends of members 54 and against pusher members 185 provided, as shown, on the shanks of hooks 54. Having arrived at the half-way position, the bars 55 are latched there until it is time to turn the welt.

The movement of the welt bars 55 to the half-way position involves a partial rotation of shaft 44. Shaft 44 has a cam 180 thereon (Figs. 25 and 27) adapted to act on lever 148. As the shaft 44 moves the bars 55 toward the needle row, cam 180 turns from the position shown in Fig. 25 to that shown in Fig. 27 thereby moving lever 148 to withdraw finger 147 from the notch 146 in disk 145 and permitting draw-off shaft 65 to turn due to the torque produced by weighted rope 120. Each pair of straps 133 is thereby tensioned to draw hooks 64 forwardly away from the needle row and to engage the hooks 64 with the welt wires 136. After knitting has proceeded for a while after the hooks 64 are first moved, the shaft 44 and welt bar 55 remaining stationary in the meantime, hooks 64 will have assumed the position shown in Fig. 5 in which the welt wire is on the other side of the bar 55 from the needle row, the loops of the first course being forward away from the welt hooks and against pusher members 185. When the welt fabric is completed shaft 44 is operated to push bar 55 toward the needles until it strikes a stop 187 (Fig. 3) at which time the hooks 54 project the maximum distance between the needles, the first courses of loops being then automatically returned to the needles while the hooks are in this position. The knitting then continues with draw-off torque being applied by shaft 65. The straps 61 are released from the welt bars 55 and the bars unhooked from the fabric and placed in their most forward position in engagement with pins 59, after which the straps 61 are again attached to the welt bars in the usual manner, so that they stand in readiness for the beginning of another cycle.

After straps 61 have been disconnected, draw off tension continues to be applied to the fabric through shaft 65 by rope 120 until hooks 64 have been returned to positions in juxtaposition to the draw-off rollers 77 as shown in Fig. 6. By this time, it is necessary to release the draw-off rollers 77 from members 80. This is accomplished by releasing arm 69 from latching shoulder 112, an operation accomplished by means 156 as previously described. While the machine has been knitting fabric under the influence of rope 120, the shaft 65 has been revolving in the direction of arrow R in Fig. 27 and worm 164 has consequently been turning in the direction to move disk 160 to the left as viewed in Fig. 17. By the time hooks 64 have reached a position next to the draw-off rollers, or just before this point, pin 157 and lever 108 are thrown into the position shown in Fig. 18. This is done by a block 186 which fills the groove of worm 164 at a point near the left end of the worm as viewed in Fig. 18. When disk 160 approaches the left end of the worm, block 186 strikes the disk and throws it up into the recess 165 as shown in Fig. 18. Lever 108 thereupon releases lever 69 and spring 74 swings shaft 70 to move the lever downwardly. At the time lever 69 is released by shoulder 112 on lever 108, cam piece 68 is in its topmost position as shown in Fig. 22 and, in general, disk 66 is in such position that it blocks cam piece 68 from moving downward unless the cam piece is moved in the direction away from shaft 65. To permit such a movement of piece 68, it has its lower right hand corner as viewed in Figs. 22 and 23 cut off as shown at 188 to present a surface to disk 66 which is approximately tangential to the surface of the disk. The disk therefore reacts against cam piece 68 in a direction to move the cam piece against the tension of said spring 73 out of the way of the disk as shaft 70 swings arms 69 and 78 downwardly to withdraw wedge members 80 from within the draw-off rollers 77 to not only unlatch the rollers to permit them to rotate but also release bolt members 83 to permit them to enter slots 86 in flanges 90 of cylindrical members 91 as they are aligned therewith to lock the rollers to members 91.

It may happen that the tension in the fabric in each section of the machine is not always the same, due to slight variations in the length of loops in the various fabrics. Such differences in tension will result in bolts 83 not being all in alignment with their respective slots 86 when they are released by the wedges 80. In such cases bolts 83 which are not in alignment with their slots will be pressed against the flanges 90 by their associated springs 85 until the slots 86 are aligned therewith whereupon the bolts are pressed in the slots by the springs 85.

The means compensating for such variation in tension can best be understood from Figs. 10, 11 and 13. Disk member 96 being fixed to shaft 65 by suitable means, as shown, and pins 98 being fixed to part 99, pins 94 and therefore flange 90 and member 91 to which pins 94 are fixed, are drawn around by the tension springs 97 which connect pins 94 and 98, member 96 having the slots or groves 193 therein to accommodate springs 97. However, pins 94, while connected to flange 90 of member 91, extend into the notches 95 one in each of the parts of disk 96 at the sides of the grooves 193. When shaft 65 and disks 96 are held stationary due to the latch finger 147 engaging the notch 146 in disk 145 there is no tension on straps 133 so that the tension springs 97 are in contracted condition to hold the pins 94 against the leading walls, in the direction of rotation, of their notches 95 and closer to the pins 98 (Fig. 13). When, however, shaft 65 is released to turn in the draw-off direction, to draw off fabric, the draw-off tension in straps 133 causes parts 90 and 91 to lag behind the disks 96 and, the torque in the shaft 65 being sufficient to overcome the tension of the springs 97, pins 94 are thereby drawn against or to a position adjacent the trailing walls 196 of the notches 95.

It is desired to change the motive means of draw-off shaft 65 from the weight on rope 120 to a spring means, this preferably occurring prior to the time shaft 70 is turned to withdraw wedges 80 from the draw-off rollers. In the construction shown, the pull of the weight on rope 120 is utilized to effect the change over. It is also desired to sever the driving connection between the rope and the shaft, to utilize the draw-off action for the change over, and also to ensure that the draw-off tension will not be doubled when the spring means begins to operate.

To this end, means 205 is provided which includes an axle 206 which is fixed to the frame of the machine and an arm 207 which is fixed to the axle 206 by a set screw 208 (Fig. 37) or other suitable means. Pivoted on axle 206 is a lever arm 209 which is on the opposite side of sheave 118 from the handle 130 and in front of arm 207 as viewed in Figs. 36, 38 and 39. A spring 210 is connected between a pin 211 on lever 209 and a pin 212 on a lever 213 also mounted for limited pivoted movement on the axle 206 (Fig. 30). Spring 210 tends to turn arm 209 in the counterclockwise direction as viewed in Fig. 36, normally holding arm 209 substantially in the vertical position as shown in Figs. 38 and 39 and in which a projection 214 forming part of arm 209 rests against a set-screw 215 fixed in a part 216 projecting from the side of lever 213 (Fig. 30). Pivoted at the lower end of arm 207 on a bolt 217 and extending generally upwardly therefrom is a latch lever 218 having a shoulder 219 thereon on the side toward projection 214 on lever 209. A lever 220 is pivoted near its midpoint to the upper end of lever 218 and a spring 221 (see Fig. 40) connected between a pin 222 at the lower end of lever 220 and a pin 223 on arm 207 tends to draw lever 218 in a clockwise direction as viewed in Fig. 36 to press projection or shoulder 219 against projection or shoulder 214. A pin 224 fixed to lever 218 limits the rotation of lever 220 on its pivot so that the tension of spring 221 is transmitted to lever 218. Also, a pin 225 on lever 218 limits the movement of lever 213 in response to spring 221 by contacting the edge of fixed arm 207 (Fig. 40). It will be noted also that the upper ends of levers 209 and 220 are bevelled in opposite directions.

Sheave wheel 118 has a horizontal pin 226 thereon which projects across the vertical plane of levers 209 and 220 and whose path causes it to touch the upper ends of these levers when they are in the position shown in Fig. 38. When the wheel is turned in the counterclockwise direction as viewed in Fig. 36 to wind up rope 120, pin 226 will snap by the end of lever 220 because spring 221 will yield to allow lever 220 to turn, pin 224 being also in the position to permit lever 220 to turn in the direction needed to permit pin 226 to pass lever 220. Further, when pin 226 contacts lever 209 as the pin moves in the counterclockwise direction, lever 209 also rotatively yields on axle 206, being turned into the position shown in Figs. 33 and 36, whereupon spring 221 snaps shoulder or projection 219 underneath projection 214 to latch 209 in the position shown in Fig. 36 and in which its upper end is below the path of pin 226. Consequently, when the direction of travel of wheel 118 and pin 226 is reversed or in a clockwise direction as viewed in Fig. 36, as occurs when rope 120 is supplying the draw-off tension, pin 226 can and does pass above the upper end of lever 209 without disturbing it. The pin 226, however, touches a point at the upper end of lever 220. Lever 220 is not free to turn on its pivot to let pin 226 pass because of its engagement with pin 224 on lever 218. Therefore, pin 226, as it passes levers 209 and 220 in the first revolution of wheel 118 in the draw-off direction after the rope 120 has been wound up, does not directly affect lever 209 but strikes the bevelled face of lever 220 and thereby moves lever 218 counterclockwise as viewed in Figs. 36, 38 and 39 to draw shoulder 219 out from under projection 214, lever 218 moving far enough to permit pin 226 to pass above the top of lever 220 as shown in Fig. 38. Thereafter it is drawn back to the position shown in Fig. 39 by spring 221. As soon, however, as shoulder 219 is moved from under projection 214, lever 209 snaps up to the vertical position as shown in Fig. 38 and on the next revolution of the wheel pin 226 engages lever 209 to stop wheel 118, the parts then occupying the position shown in Fig. 39. The pull on lever 209 is transmitted to lever 213 through screw 215 and lug 216 and is in any case sufficient to move lever 213. This lever is mounted for limited angular movement counterclockwise from the position shown in Figs. 31 and 33.

As disclosed in Patent No. 2,413,601, the movement of lever 213 in the counterclockwise direction throws a rod 227 from the position shown in Figs. 33 and 36 in which rod 227 is free of a square pin 228 to the position shown in Fig. 39 in which a notch 229 at the upper end of rod 227 engages pin 228. The arrangement of lever 213 for this purpose is best shown herein in Figs. 30 and 33 from which it is apparent that lever 213 is mounted on the same axle as lever 209, the movement of lever 213 being limited by set screws 232 and 233, one or the other of which strikes against a fixed frame portion 200 (Fig. 31) depending on the direction of movement of the lever 213. A tension spring 234 holds lever 213 normally in position to keep set screws 232 against portion 200. Lever 213 has a guide member 235, best seen in Fig. 30, at its lower end in which rod 227 is mounted to slide. It will be clear that when set screw 233 of lever 213 is pushed against portion 200 by lever 209, rod 227 is moved to engage pin 228, as previously stated. Pin 228 is fixed, as shown, in the outer end of a lever 230 which is fixed to a shaft 231 which in this instance is the usual needle presser shaft of the machine.

The immediate effect of raising rod 227 is best seen from Fig. 30. Near its lower end, rod 227 has a pivoted joint 236 therein whereby the part of the rod above joint 236 may swing toward and away from pin 228. The portion 237 of rod 227 below the joint 236 is mounted to move vertically in a guide sleeve 238 shown as fixed to the front beam A of the machine frame by a bolt 240. The lower end of portion 237 is adapted to engage and hold, so long as desired, a collar 241 fixed on a generally horizontal control rod 242, the lower end of portion 237 being notched at 243 to provide a vertical face or shoulder for engaging an end of collar 241 as shown. Rod 242 forms part of the patterning means of the machine and is urged toward the left as viewed in Fig. 30 by a spring (not shown), and moved toward the right at times as viewed in said Fig. 30 by a portion of the patterning means proper such as the main or an auxiliary pattern chain, neither of which are shown but which are well known in the art, both being shown in Patent No. 2,413,601. In the arrangement of said patent and as employed herein, the auxiliary pattern chain first moves rod 242 to the right to the position shown in which it is automatically locked by collar 241 and shoulder 243. When the shaft 231 is operated to turn lever 230 counterclockwise as viewed in Fig. 39, the upper end of rod 227 being in engagement with pin 228 as shown in Fig. 39, rod 227 is thereby lifted to release rod 242 which is thereupon moved to the left by its spring.

Movement of rod 242 to the left operates means to throw into action a spring operated motive means for the draw-off shaft 65 as a substitute for the weighted rope 120. For throwing into action such substitute motive means, the arrangement shown includes a bell-crank lever 245 pivoted on the frame of the machine near the central point of the lever and having an arm 246 shown in a near vertical position, the end of which lies between two collars 244 fixed on rod 242. Therefore, movement of rod 242 moves bell-crank lever 245 thereby moving an arm 247 of the lever 245 which lies in a near horizontal position and the end of which loosely embraces a substantially vertical rod 248 and lies between a pair of collars 249, so that movement of lever 245 imparts a vertical movement to rod 248. The upper end of rod 248 is shown in detail in Fig. 35. Rod 248 is pivotally connected at its upper end to an arm 250 journalled on the draw-off shaft 65. Arm 250 has two parts acting as control cams, one of such parts being shown at 251 and the other at 254. Cam part 251 controls a pawl 252 (Fig. 31) which is oscillated by said spring motive means so that it may, when desired, turn shaft 65 in the draw-off direction by acting on a toothed wheel 253 fixed on shaft 65, as shown in Fig. 34. Cam part 254 controls an arm 255 and thereby controls a pivoted bell-crank lever 256 which has a projection 257 arranged to control in turn a holding pawl or holding pawls 258, shown in Fig. 34, and arranged to act on said toothed ratchet wheel 253 to hold draw-off shaft 65, when desired, against turning counter to the draw-off direction. Control cam parts 251 and 254 are so correlated that, when pawl 252 is permitted to rack shaft 65 in the draw-off direction, pawls 258 are permitted to engage toothed wheel 253 to prevent shaft 65 from turning in the contrary direction.

It will be seen therefore that so long as horizontal control rod 242 is held to the right by rod 227, as shown in Fig. 30, vertical rod 248 is in its lower position and control cam parts 251 and 254 are held in the position as viewed in Fig. 31. The racking pawl 252 and holding pawl or pawls 258 are then ineffective due to the fact that a pin 259 fixed to pawl 252 is then on a high spot 260 on part 251 which lifts pawl 252 off the wheel 253 while a pin 261 fixed to arm 255, as shown, is on another high spot 262 on part 254 so that projection 257 is pressed against the under side or sides of the holding pawl or pawls 258 to swing them counterclockwise out of contact with toothed wheel 253. Said pin 259 is extended through pawl 252 to project from its other side and provide a handle 290 (Fig. 32). A spring 263 connected between handle 290 and an arm 266, to be hereinafter described, urges pawl 252 toward wheel 253 while a spring or springs 264 connected between the pawl or pawls 258 and a fixed point urge pawl or pawls 258 toward wheel 253. Except when it is desired that draw-off shaft 65 be driven by the spring motive means or the shaft is under the influence of weight W, shaft 65 is free to turn for purposes of adjustment and for such other purposes as may be desired. It will be seen, however, that when the rod 227 is lifted to release rod 242, the spring for rod 242 causes rod 248 to be raised and arm 250 is thereby turned clockwise to the position shown in Figs. 34 and 35 and in which low spots on cam parts 251 and 254 are in contact with pins 259 and 261 respectively to permit pawls 252 and 258 to be moved by their springs 263 and 264, respectively, to cooperate with wheel 253 to rack the wheel and the shaft 65.

The spring motive means is indicated as a whole by numeral 265 on Fig. 1 and is closely analogous to the spring motive means for the draw-off shaft shown in my prior Patent No. 2,295,512, of September 8, 1942, and for purposes of convenience it will only be generally described herein as follows:

The racking pawl 252 is pivotally mounted on an upwardly inclined arm 266 of a lever 267 which is pivotally mounted on shaft 65. Lever 267 has a second arm 268 shown as substantially horizontal and pivotally connected at its right hand end (as viewed in Fig. 31) with the upper end of a generally vertical rod 270 the lower end of which is pivotally connected to a yoke 271 (Fig. 1). The yoke 271 is acted on by a set of levers which are pivoted intermediate their ends and which have their one ends resting on the lower bar of the yoke 271 while their other ends are connected to individual tension springs 269 which extend upwardly to a connection with a vertically adjustable bar 272, the springs tending to urge the yoke 271 and rod 270 downwardly, thereby in turn urging shaft 65 in the draw-off direction, the clockwise direction as viewed in Fig. 1, whenever pawl 252 is in action. Means is provided whereby, at each revolution, the yoke 271 may be lifted to lift rod 270 and to permit pawl 252 to obtain a fresh hold on wheel 253. Said means for lifting yoke 271 includes a lever 273 fixed to a pivotally mounted shaft 274. The left end of lever 273, as viewed in Fig. 1, is connected by a tension spring 275 to a fixed point on the frame of the machine. Spring 275 acts to draw a roller-type follower 276 pivotally mounted on lever 273 against a cam 277 fixed on the main cam shaft S of the machine. Shaft 274 has also fixed thereto a lever 278, spaced from but acting as an extension of lever 273, lever 278 having a fork 279 at its free or right hand end as viewed in Fig. 1 to engage a pin 280 connected with the yoke 271 to lift the rod 270. Further details of the construction and the operation thereof is to be found in the aforementioned "Reading" catalogs and Patent No. 2,295,512.

When the shaft 70 is turned to withdraw the wedges 80 from the locking members 83 to lock the draw-off reel 77 to the shaft 65 it is also desirable to disengage the pawl 117 from the disk 116. The means shown for this purpose comprises an arm 190 which, as shown in Fig. 19, is fixed to the end of shaft 70 at the right hand end of the machine as viewed when facing the needle row. A portion 197 of arm 190 extends at right angles to shaft 70 toward shaft 65 and has a lateral projection 191 near its free end which is adapted to engage a pin 192 which projects laterally from pawl 117, whereby pawl 117 is moved out of engagement with disk 116. The pawl 117 is again engaged to the disk when the handle 75 and shaft 70 are moved in a counterclockwise direction as hereinbefore set forth to lock the draw-off reel 77 in a predetermined position, the movement of the shaft 70 disengaging the arm 190 from the pawl 117 to permit the pawl to be drawn by the spring 119 against the disk 116. Thereupon, when the handle 130 is manipulated to advance the straps 133 toward the needles, the shaft 65 is turned until the pawl 117 engages the shoulder 115 in the disk 116 so that a continued turning movement of the shaft also winds up the weight W.

The method of operation of the mechanism herein disclosed will be obvious to those skilled in the art from the foregoing description, but for purposes of convenience, will be reviewed below:

When it is desired to begin a set of blanks on a machine such as 50 provided with a combined means for hooking up the first course and for turning the welt, yarn is laid to the needles to form a first course and welt bars 55 are run toward the needles by levers 57 so that loops of the first course are received on the hooks 54 in bars 55 and a draw-off tension is applied to the bars 55 by straps 61, which are connected to a weight operated auxiliary draw-off shaft 63. Knitting then proceeds for a time while preparations are made for the draw-off function to be taken over by the main draw-off shaft 65. However, just after a group of knitted blanks have been completed and removed from the draw-off reels 77, the angular position occupied by the draw-off shaft will be entirely accidental. The relative position of each draw-off reel to its shaft will, however, be fixed because there will be no tension on the draw-off reel and the springs 97 will hold the pins 94 all in the same position relative to the members 96 which are fixed to shaft 65, pins 94 being fixed to flanges 90, on rotatable members 91 which are, at the time, locked to the draw-off reels. Also, at this time, the slidable segmental cam piece 68 supported from shaft 70 is below disk 66.

The handle 75 is then manually turned in counterclockwise direction and the shaft 65 is manually rotated until the corner of cam piece 68 engages recessed surface 67 and turns the shaft 65 to the position in which wedges 80 may operate bolts 83 to unlock the draw-off reels from the shaft and at the same time latch the draw-off reels against movement. In the meantime, this action of setting shaft 65 in the desired position removes bridge piece or block 186 on worm 164 out of the way of traveller 160 and the final movement of shaft 70 causes the wedge 107 on arm 69 on the shaft 70 to act on the complementally inclined surface 111 on the latch lever 108 to swing the latching shoulder 112 on lever 108 into position to latch arm 69 and shaft 70. Turning movement of shaft 70 also disengages arm 190 from pawl 117 permitting the spring 119 to draw the pawl against the disk 116. The shaft 65, having been freed from draw-off reels 77, is rotated by engaging pinion 121 with gear 122 and turning handle 130 to unwind the straps 133 from the members 91 and to advance the hooks 64 toward the needles. Continued rotation of the shaft brings the shoulder 115 on disk 116 fixed to the shaft 65 into contact with the end of the pawl 117 pivoted on the sheave 118 to turn the sheave to wind up the weight W. As rotation of the shaft 65 advances the straps 133, the worm 164 has pushed traveller 160 toward the right as viewed in Fig. 17 and thereby has pressed traveller 160 against the lower edge of the lever 159 shown in Fig. 17, thereby moving lever 159 against the tension of a spring 155 and swinging auxiliary latch 149 out of the plane of a stop latch 148 for shaft 65. Stop latch lever 148 is thereupon swung by its spring 161 so that finger 147 enters a notch 146 in a disk 145 on the shaft 65 to latch this shaft temporarily in the position corresponding to the desired forward position of hooks 64. At this time, welt wires 136 are placed in the cut out portions 178 of the U shaped members 170 and pressed down into the slots 166 of rails 58 as shown in Fig. 14, in which the wires 136 are just forward of hooks 64.

Shortly after the welt wires have been put in place, the pattern means of the machine causes the shaft 44 to be operated to move the welt bars 55 from the position shown in Fig. 4 to an intermediate or "half-way" position shown in Fig. 5, the welt bars and levers being latched in this position until the next forward movement of the pins 59, arms 57 and levers 56 on shaft 44. Operation of shaft 44 causes cam 180 thereon to operate and remove the finger 147 of lever 148 from its latching engagement with disk 145 to release the shaft 65 at the time the welt bars 55 move into said half-way position (Fig. 5), the resulting position of lever 148 being shown in Fig. 27. Upon release of the shaft 65, the weight W acts on the shaft to draw the hooks 64 forwardly against the wires 136 to tension the fabric. Knitting then continues until the full desired length of the welt has been formed, the shaft 44 being then operated a second time in the cycle in order to push welt bars 55 to the position in which the loops of the first course are restored to the needles to close the welt. The draw-off tension on the bars 55 is then released, the bars 55 are disengaged from the fabrics and placed against the pins 59, the straps 61 connected to the bars 55 and tension partially applied to straps 61 to hold the bars against the pins in readiness for the next hooking up operation as shown in Fig. 6.

Shaft 65 having been released by lever 148, weight W operates it in the draw-off direction to wind up the straps 133 and to draw the hooks 64 toward the draw-off rollers and to turn the worm 164 so as to move traveller 160 to the left as viewed in Fig. 17. Movement of the traveller 160 to the left releases arm 159 and spring 155 turns latch lever 149 in a clockwise direction to latch lever 148, as shown in Figs. 27 and 28. Continued rotation of the shaft 65 in the take-off direction also rotates the pin 226 on sheave 118, the pin 226 passing above the lever 209 in the first portion of its movement. Upon continued movement of the shaft and pin 226, the pin engages the lever 220 thereby releasing the lever 209 from latching engagement with the shoulder 219 on lever 218 and permitting the lever 209 to be turned to the position shown in Fig. 38. The shaft 65 and pin 226 continue to rotate in the draw-off direction, clockwise as viewed in Figs. 36, 38 and 39, until the pin 226 engages the lever 209 thereby swinging lever 213 to move the upper edge of the notch 229 in rod 227 into the path of the pin 228 in the lever 230 on shaft 231. The shaft 231, which is the usual presser shaft of the machine, upon being operated by its associated cam raises rod 227 thereby releasing the rod 242 whereby the spring connected to the rod and a fixed part of the machine (not shown) shifts the rod thereby operating the lever 245 and rod 248 to turn the arm 250 on the shaft 65 so that pawls 252 and 258 may cooperate with the teeth of wheel 253. The pawl 252 is operated from the means 265 as hereinbefore set forth to rack the shaft 65 in the draw-off direction.

As hooks 64 approach the draw-off rollers 77, the traveller 160 approaches the point at which block 186 will throw it out of the groove in worm 164. This block 186 is so placed that it throws the traveller out of the groove of worm 164 and releases arm 69 from shoulder 112 of latch lever 108 and spring 74 then turns handle 75, shaft 70 and arm 69 clockwise as viewed in Fig. 22 so that arms 78 are moved to withdraw wedges 80 from the draw-off rollers 77 and release bolts 83 to enter notches 86 in flanges 90.

The same movement of shaft 70 that causes the withdrawal of wedges 80 from the draw-off rollers also causes projection 191 on arm 197 to disconnect the driving pawl 117 from the shaft 65.

It will be understood that, in general, the form of welt bar 55 and pusher members 185 shown herein are disclosed and claimed in my prior Patent No. 2,431,160 of November 18, 1947.

Of course, the improvements specifically shown and described by which the above results are obtained, can be changed and modified in various ways without departure from the invention herein disclosed and hereinafter claimed.

I claim:

1. In a straight knitting machine having welt wires and welt wire engaging hooks, a mechanism for moving said hooks toward and away from the needles comprising a set of draw-off rollers coaxial with a common shaft therefor, means to connect said rollers to said shaft, means to release said shaft from said rollers for free movement of the shaft, straps mounted to move with said shaft in both directions and having said welt wire engaging hooks fixed thereon, and means to turn said shaft in one direction to move said hooks toward the needles and in the other direction to draw off fabric after engagement of the hooks with said welt wires.

2. In a straight knitting machine, the mechanism as set forth in claim 1 together with means to latch the draw-off shaft with the welt wire hooks relatively near the needles, means to advance a welt bar to an intermediate position, and means responsive to said advancing means to unlatch the draw-off shaft.

3. In a straight knitting machine, a mechanism as set forth in claim 1 together with means responsive to a given angular rotative movement of the draw-off shaft in the draw-off direction to make the releasing means inoperative and permit the connecting means to operate.

4. In a straight knitting machine, a mechanism as set forth in claim 1 together with a first and a second means for turning the draw-off shaft in the draw-off direction and means responsive to a given rotative movement of the draw-off shaft in the draw-off direction for throwing into action said second means.

5. In a straight knitting machine, a mechanism as set forth in claim 1 together with a first means for motivating draw-off of fabric, a second means for motivating draw-off of fabric, a spring means for motivating draw-off of fabric, means operated after the formation of a given length of fabric for throwing into action said second means for motivating the draw-off, and means responsive to the progress of the draw-off action to throw out of action said second motivating means and to throw into action said spring motivating means for the draw-off.

6. In a straight knitting machine, the mechanism as set forth in claim 1 together with a disk on the shaft for the draw-off rollers and having an arcuate recessed surface therein, a hand lever on a shaft having an arcuate cam adapted when engaged with said recessed surface to turn the draw-off shaft to a predetermined angular position, and at the same time to release the draw-off rollers from the shaft and to latch said rollers in a definite angular position.

7. In a straight knitting machine, the combination of a draw-off shaft having a plurality of draw-off rollers mounted thereon, means to latch the draw-off rollers in a given angular position while said shaft is free to turn, straps connected to said shaft and having welt wire draw-off hooks thereon, said straps acting to move said hooks toward the needles when the shaft is turned in the direction opposite to that for drawing off fabric, a latch for stopping and temporarily holding said shaft in a position in which said hooks are adjacent the needles, a welt bar pushing means having an intermediate position, and means responsive to the movement of said welt bar pushing means to its intermediate position to release said shaft from said stopping latch.

8. In a straight knitting machine, the combination as set forth in claim 7 together with a shaft forming part of the means for latching the draw-off rollers, draw-off motivating means acting while the draw-off rollers are latched including a means for turning the draw-off shaft and means on said shaft of the latching means for putting said turning means out of action when the draw-off rollers are unlatched.

9. In a straight knitting machine, the combination as set forth in claim 7 together with means including a weight actuated sheave for turning the draw-off shaft, another means for turning the draw-off shaft, and means actuated by a part on said sheave for throwing said other means into operation and also for sustaining the pull of the weight for said sheave.

10. In a straight knitting machine, the combination including a draw-off shaft having fixed thereon a disk having an arcuate recessed surface therein, a lever shaft having a cam piece adapted to engage said recessed surface and to turn the draw-off shaft to a definite angular position when moving in one direction, resilient means for moving said cam piece into position to abut the face of said recessed surface, and mounting means for said cam piece permitting it to slide in the direction away from the center of the draw-off shaft to pass said disk when the cam piece is moving oppositely to said one direction.

11. In a straight knitting machine, the combination of a draw-off shaft having a plurality of draw-off rollers thereon so mounted as to revolve at times relative to the shaft, locking means operative to connect said rollers to the shaft, latch means acting substantially simultaneously on said rollers to hold them all in a fixed position and to release said locking means, and means to preliminarily bring said shaft into a predetermined angular position in which said rollers are in a position to be engaged by said latch means.

12. In a straight knitting machine, the combination as set forth in claim 11 together with welt wire engaging hooks, straps mounted to move with the draw-off shaft in both directions and having said hooks fixed thereon, means to turn said draw-off shaft in one direction to move said hooks toward the needles and in the other direction to draw off fabric after engagement of the hooks with the welt wires.

13. In a straight knitting machine, the combination as set forth in claim 11 together with welt wire engaging hooks, straps mounted to move with the draw-off shaft in both directions and having said hooks fixed thereon, a stop latch acting to engage and hold the draw-off shaft when said hooks are in a predetermined position, means to release said shaft from said stop latch when desired to permit said hooks to exert a draw-off action on welt wires, and a motive means for turning the draw-off shaft as soon as it is released by said stop latch.

14. In a straight knitting machine, the combination as set forth in claim 11 together with welt wire engaging hooks, straps mounted to move with said shaft in both directions and having said hooks fixed thereon, means to turn the draw-off shaft to move said hooks toward the needles and in the other direction to draw off fabric after engagement of the hooks with welt wires, the latch means being adapted to latch the draw-off rollers before the beginning of the movement of the hooks toward the needles, means to latch the draw-off shaft to stop the movement of said hooks toward the needles, auxiliary draw-off means acting while the draw-off shaft is latched, means to unlatch the draw-off shaft, means to hold said stop latch out of action, and means to release the latch means for the draw-off rollers when the draw-off shaft has returned approximately to the position at which the draw-off rollers were latched and to simultaneously lock the draw-off rollers so that they rotate with the draw-off shaft.

15. In a straight knitting machine, the combination as set forth in claim 11 together with a worm on the draw-off shaft, means associated with said worm for unlatching the draw-off rollers to permit their being locked to rotate with the draw-off shaft, a stop-latch for the draw-off shaft, means to hold said stop-latch out of action, and means associating the holding means with said worm for causing said holding means to release said stop latch for a short portion of the cycle of the machine only while holding the stop latch inactive the remainder of the time.

16. In a straight knitting machine, the combination of a rotatable draw-off shaft with draw-off rollers thereon, a worm turning with said shaft, a lever, means associated with said lever for unlocking the draw-off rollers from said shaft, a traveller thrown by said lever into position to engage said worm, a stop latch for said shaft, means for moving said stop latch out of latching relation to said shaft, an auxiliary latch for holding said stop latch out of action, and means whereby said worm releases said stop latch from said auxiliary latch for a portion only of a cycle of the machine and returns the stop latch to the control of said auxiliary latch when the stop latch has been moved out of contact with the draw-off shaft by said means for moving the stop latch.

17. In a straight knitting machine, the combination of a draw-off shaft, welt wire engaging hooks, straps mounted to move with said shaft in both directions and having said hooks fixed thereon, means to turn said shaft in one direction to move said hooks toward the needles and in the other direction to draw off fabric after engagement of the hooks with the welt wires, a stop latch for said draw-off shaft, means for moving said stop latch out of stopping relation with said shaft, an auxiliary latch for holding said stop latch out of action, and means for releasing said stop latch from said auxiliary latch for a portion only of a cycle of the machine and for returning the stop latch to the control of the auxiliary latch when the stop latch has been moved out of stopping relation with the draw-off shaft by said second means.

18. In a straight knitting machine, the combination of a draw-off shaft, straps mounted to move with said shaft in both directions and having welt wire engaging hooks fixed thereon, means to turn said shaft in one direction to move said hooks toward the needles and in the other direction to draw off fabric after engagement of the hooks with the welt wires, a stop latch for said draw-off shaft, means for moving said stop latch out of stopping relation with said shaft, an auxiliary latch for holding said stop latch out of action, and means including a traveller moving relatively to said shaft for releasing said stop latch from said auxiliary latch for a portion only of a cycle of the machine and for returning the stop latch to the control of the auxiliary latch when the stop latch has been moved out of stopping relation with the draw-off shaft.

19. In a straight knitting machine, the combination as set forth in Claim 18 and in which the means including the traveller includes also a worm turning with the draw-off shaft and moving the traveller first in one direction and then in the other.

20. In a straight knitting machine, the combination as set forth in claim 18 and in which the means including the traveller includes also both a worm turning with the draw-off shaft and moving the traveller first in one direction and then in the other and a lever contacted by said traveller to operate the auxiliary latch.

21. In a straight knitting machine, the combination of a draw-off shaft having a set of draw-off rollers thereon, a second shaft having arms thereon arranged to engage said rollers to hold them each in a predetermined angular position, means for latching said second shaft to hold the arms in a holding position for a time, a stop latch for said draw-off shaft, means for moving said stop latch out of stopping relation with said shaft, an auxiliary latch for holding said stop latch out of action, means including a traveller for releasing said stop latch from said auxiliary latch for a portion only of a cycle of the machine and means including a spring connection between said latch for the second mentioned shaft and said auxiliary latch for returning the stop latch to the control of the auxiliary latch when the stop latch has been moved out of stopping relation with said draw-off shaft.

22. In a flat knitting machine having a needle row, the combination of an auxiliary draw-off shaft acting to draw off fabric for a time, a main draw-off shaft acting on welt wires, hooks for engaging the welt wires, means including straps connecting said hooks to said main draw-off shaft and initially wound on the shaft, means whereby said main draw-off shaft may be turned to unwind said straps to run said hooks toward the needles, means to automatically stop and latch said main draw-off shaft when said hooks arrive at a predetermined position relative to the needle row, and means to unlatch said main draw-off shaft and to initiate a draw-off movement thereof when a predetermined amount of fabric has been knitted and drawn off by said auxiliary draw-off shaft.

23. In a flat knitting machine having a needle row, the combination as set forth in claim 22 together with means for setting the main draw-off shaft in a predetermined angular position before beginning to unwind the straps.

24. In a flat knitting machine having a needle row, the combination as set forth in claim 22 together with means for setting the main draw-off shaft in a predetermined angular position before beginning to unwind the straps, a plurality of draw-off rollers on the main draw-off shaft, means locking and holding said rollers all in a given angular relation to the main draw-off shaft when such shaft is free to draw-off tension and means to unlock and to latch said rollers in positions corresponding to said angular position of the main draw-off shaft prior to beginning the movement of the hooks for the welt wires toward the needle row.

25. In a flat knitting machine having a needle row, the combination as set forth in claim 22 together with a plurality of means for turning the main draw-off shaft in the draw-off direction, and automatic means acting when the main draw-off shaft has wound up the straps to a predetermined point for shifting from one of said turning means to another.

26. In a flat knitting machine having a needle row, the combination as set forth in claim 22 together with means for setting the main draw-off shaft in a predetermined angular position before beginning to unwind the straps, a plurality of draw-off rollers on the main draw-off shaft, means locking and holding said rollers all in a given angular relation to the main draw-off shaft when such shaft is free of draw-off tension, means to unlock said rollers relative to the main draw-off shaft and to latch the rollers in positions corresponding to said angular position of the main draw-off shaft prior to beginning the movement of the hooks for the welt wires toward the needle row, a plurality of means for turning the main draw-off shaft in the draw-off direction and automatic means acting when the main draw-off shaft has wound up the straps to a predetermined point for shifting from one of said turning means to another.

27. In a straight knitting machine, a mechanism as set forth in claim 1 together with a first and a second means for drawing off the fabric, means for moving a welt bar and means responsive to the action of said welt bar moving means for initiating the action of said second draw-off means.

28. In a straight knitting machine, the combination of hooks for engaging welt wires to apply a draw-off tension thereto and means for running said hooks into a position between the needles and the position of the welt wire when first placed on a fabric comprising a draw-off shaft and straps connecting said shaft with said hooks and having a transverse curvature adapting the straps to better transmit a thrust from said shaft to the hooks.

29. In a straight knitting machine, the combination including a draw-off shaft, a lever shaft, and normally non-cooperating means on said shafts operable upon gradual movement of said draw-off shaft and manually applied pressure on said lever shaft to bring said draw-off shaft to a definite given angular position.

30. In a straight knitting machine, the combination including a draw-off shaft, a lever shaft, draw-off rollers on said draw-off shaft, means to lock said rollers to members on the draw-off shaft and connected thereto, means on said lever shaft for unlocking said rollers simultaneously when the draw-off shaft is in a given posion without draw-off tension thereon, and normally non-cooperating means on said shafts operable upon gradual movement of said draw-off shaft and pressure on said lever shaft to bring said draw-off shaft to a definite given angular position in which a further movement of said lever shaft causes said unlocking means to disconnect the draw-off rollers from the draw-off shaft.

31. In a straight knitting machine, the combination of a rotatable draw-off shaft with draw-off rollers thereon, a worm turning with said shaft, a lever, means associated with said lever for unlocking the rollers from said shaft, a stop latch for said shaft, a latch lever for said lever, means for moving said stop latch out of latching relation to said shaft, an auxiliary latch for holding said stop latch out of action, a tension spring connecting said auxiliary latch lever for urging the auxiliary latch toward active position and a traveller mounted on said latch lever and thrown into driven relation with said worm when said latch lever is moved into active position and acting to throw said auxiliary latch out of active position when the traveller is at one end of its path and to throw said latch lever out of active position when the traveller is at the other end of its path.

32. In a multi-section full-fashioned knitting machine having a needle row and hooks for operating on welt wires to draw-off fabric, a mechanism economizing in time required to connect the welt wires and hooks in all the sections and including straps for carrying said hooks having sufficient stiffness for moving the hooks toward the needle row as well as away from the needle row, means including a draw-off shaft for running said straps toward the needle row to a desired position relatively adjacent thereto, and means acting on said shaft for latching all said hooks simultaneously in said desired position.

33. In a multi-section full-fashioned knitting machine having a needle row, a draw-off shaft having draw-off rollers thereon and hooks for operating welt wires to draw off fabric, the combination of means normally locking the draw-off rollers to parts carried on said draw-off shaft, a mechanism economizing in time required to connect the welt wires and hooks in all the knitting sections and including straps for carrying said hooks and having sufficient stiffness to move the hooks toward the needle row as well as away from the needle row, a control station, mechanical means operated from said station for simultaneously disconnecting said draw-off rollers from their shaft and for latching the draw-off rollers in fixed position, mechanical means operated from said station for operating the draw-off shaft in the direction opposite to normal while said rollers are disconnected for running said hooks to a desired position relative to the needle row, releasable means at said station for latching said shaft when said hooks reach their desired positions and means whereby said draw-off rollers are released from their latching means and reconnected to their shaft upon completion of a predetermined amount of fabric after said shaft has been released by said latch means.

34. In a full-fashioned multi-section knitting machine having a needle row, draw-off rollers, a shaft for said rollers, draw-off straps connected to said shaft and hooks for delivering a draw-off tension from said shaft to welt wires, means for economizing time in bringing the welt wire hooks into draw-off relation to the fabric comprising a station, means whereby said straps may be operated from said station by said shaft to move the welt wire hooks to a desired position relatively adjacent the needle row, releasable means at said station whereby said shaft is latched, means mechanically operated from said station for latching said rollers while the hooks are being run toward the needle row and for a time thereafter, and means for unlatching said rollers upon completion of a predetermined amount of fabric after the hooks have begun to recede from said desired position.

35. In a multi-section full-fashion knitting machine having a needle row, a draw-off shaft having draw-off rollers thereon and hooks for operating welt wires to draw-off fabric, the combination as set out in claim 34 and in which the means whereby the draw-off rollers are released from their latching means includes an operating element at the station.

36. A full-fashioned knitting machine having a main draw-off shaft, and draw-off rollers on said shaft, releasable means for locking said rollers to revolve with said shaft, means for releasing said locking means and for releasably latching all said rollers simultaneously in a given angular position and means interengaging with said latching means for preventing the latching of said rollers until the draw-off shaft is in a given angular position.

37. In a flat knitting machine having a needle row, the combination of a draw-off shaft, hooks for welt wires, straps connecting said hooks to said shaft and initially wound thereon, means for setting the draw-off shaft in a predetermined angular position before beginning to unwind the straps, a plurality of draw-off rollers on the draw-off shaft, means locking and holding said rollers all in a given angular relation to the draw-off shaft when such shaft is free of draw-off tension and means to unlock and to latch said rollers in positions corresponding to said angular position of the draw-off shaft prior to beginning the unwinding movement of the straps to move the hooks for the welt wires toward the needle row.

38. In a straight knitting machine, the combination of a rotatable draw-off shaft having a plurality of draw-off rollers thereon, locking means for said rollers, a lever, means operated by said lever for unlocking said rollers, means for latching said lever to maintain said rollers unlocked, a traveller associated with said latching means, and means on said shaft for engaging said traveller to operate said latching means to unlatch said lever.

GOTTLOB BITZER.

References Cited in the file of this patent

UNITED STATES PATENTS

| Number | Name | Date |
|---|---|---|
| 2,295,512 | Bitzer | Sept. 8, 1942 |
| 2,303,412 | Wachtler et al. | Dec. 1, 1942 |
| 2,413,601 | Bitzer | Dec. 31, 1946 |

FOREIGN PATENTS

| Number | Country | Date |
|---|---|---|
| 265,174 | Switzerland | Mar. 1, 1950 |